(12) United States Patent
Kang et al.

(10) Patent No.: US 10,768,854 B2
(45) Date of Patent: Sep. 8, 2020

(54) MEMORY CONTROLLER, MEMORY SYSTEM HAVING THE MEMORY CONTROLLER, AND OPERATING METHOD OF THE MEMORY CONTROLLER

(71) Applicant: SK hynix Inc., Gyeonggi-do (KR)

(72) Inventors: Min Gu Kang, Seoul (KR); Han Choi, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/403,724

(22) Filed: May 6, 2019

(65) Prior Publication Data

US 2020/0065026 A1 Feb. 27, 2020

(30) Foreign Application Priority Data

Aug. 22, 2018 (KR) .......................... 10-2018-0098031

(51) Int. Cl.
*G06F 3/06* (2006.01)

(52) U.S. Cl.
CPC .......... *G06F 3/0658* (2013.01); *G06F 3/0604* (2013.01); *G06F 3/0656* (2013.01); *G06F 3/0673* (2013.01)

(58) Field of Classification Search
CPC .... G06F 3/0658; G06F 3/0604; G06F 3/0656; G06F 3/0673; G06F 3/0679; G06F 3/0614; G06F 2212/72; G06F 2212/7203
See application file for complete search history.

(56) References Cited

U.S. PATENT DOCUMENTS

| | | | |
|---|---|---|---|
| 2012/0195118 A1* | 8/2012 | Yang | G11C 11/5621 365/185.03 |
| 2019/0227708 A1* | 7/2019 | Hsieh | G06F 11/1666 |
| 2019/0332320 A1* | 10/2019 | Wu | G06F 3/0604 |
| 2019/0384517 A1* | 12/2019 | Lin | G06F 3/0673 |

FOREIGN PATENT DOCUMENTS

| | | |
|---|---|---|
| KR | 10-2016-0112135 | 9/2016 |
| KR | 10-2017-0056782 | 5/2017 |

\* cited by examiner

*Primary Examiner* — Tracy A Warren
(74) *Attorney, Agent, or Firm* — IP & T Group LLP

(57) ABSTRACT

A memory system includes a memory device for storing data; and a memory controller performing a program operation on the memory device by using one of a first program mode and a second program mode. The memory controller counts a number of program operations performed by using the first program mode in which a ratio of dummy data to program data is greater than or equal to a predetermined value; and changes the program mode to the second program mode from the first program mode, when the counted number is greater than or equal to a predetermined number.

14 Claims, 14 Drawing Sheets

20 # MEMORY CONTROLLER, MEMORY SYSTEM HAVING THE MEMORY CONTROLLER, AND OPERATING METHOD OF THE MEMORY CONTROLLER

CROSS-REFERENCE TO RELATED APPLICATION

The present application claims priority under 35 U.S.C. § 119(a) to Korean patent application number 10-2018-0098031 filed on Aug. 22, 2018, the entire disclosure of which is incorporated herein by reference in its entirety.

BACKGROUND

Field of Invention

The present disclosure generally relates to a memory controller, a memory system having the memory controller, and an operating method of the memory controller, and more particularly, to a memory controller capable of changing a program mode, a memory system having the memory controller, and an operating method of the memory controller.

Description of Related Art

Generally, a memory system may include a memory controller and a memory device.

The memory device may store data or output stored data under the control of the memory controller. For example, the memory device may be configured as volatile memory devices in which stored data disappears when the supply of power interrupted, or be configured as nonvolatile memory devices in which stored data is retained even when the supply of power is interrupted.

SUMMARY

Embodiments provide a memory controller capable of changing a program mode depending on a ratio of dummy data, a memory system having the memory controller, and an operating method of the memory controller.

In accordance with an aspect of the present disclosure, there is provided a memory system including a memory device configured to store data; and a memory controller configured to perform a program operation on the memory device by using one of a first program mode and a second program mode. The memory controller configured to count a number of program operations performed by using the first program mode in which a ratio of dummy data to program data is greater than or equal to a predetermined value; and change the program mode to the second program mode from the first program mode, when the counted number is greater than or equal to a predetermined number.

In accordance with another aspect of the present disclosure, there is provided a memory controller including a central processing unit configured to perform a program operation on a memory device by using a first program mode among a plurality of program modes; and a program mode control unit configured to determine whether a program mode of the memory device is to be changed to a second program mode among the plurality of program modes according to a ratio of dummy data among program data programmed by using the first program mode.

In accordance with still another aspect of the present disclosure, there is provided a memory system including a memory device including a first memory block for storing n-bits of data per cell and a second memory block for storing m-bit(s) of data per cell, wherein m and n are natural numbers, and $1 \leq m < n$; and a memory controller configured to program program data in the first memory block in a program operation, calculate a rate of dummy data to the program data programmed in the first memory block, and program subsequent program data in the second memory block when the rate of the dummy data to the program data exceeds a threshold value.

In accordance with still another aspect of the present disclosure, there is provided a method for operating a memory system, the method including performing a plurality of program operations by using a first program mode; counting a number of program operations in which a ratio of dummy data to program data is greater than or equal to a predetermined value, among program operations performed by using the first program mode; and performing subsequent program operations by using a second program mode when the counted number is greater than or equal to a predetermined number.

In accordance with still another aspect of the present disclosure, there is provided a method for operating a memory controller, the method including programming program data to a memory device by using a first program mode among a plurality of modes; calculating a ratio of dummy data among the programmed program data; and when the ratio of the dummy data exceeds a threshold value, changing a program mode of the memory device to a second program mode among the plurality of program modes. In accordance with still another aspect of the present disclosure, there is provided a memory system including a memory device including a single level cell (SLC) block and a multi level cell (MLC) block; and a memory controller suitable for programming program data in the MLC block, the program data including user data and dummy data; determining a ratio of the dummy data to the user data; and when it is determined that the ratio exceeds a threshold value, programming subsequent program data in the SLC block.

In accordance with still another aspect of the present disclosure, there is provided a memory system including a memory device including a plurality of memory blocks, the memory blocks including a first memory block for storing n bits of data per cell and a second memory block for storing m bit(s) of data per cell, where m and n are natural numbers, and $1 \leq m < n$; and a memory controller suitable for performing first program operations on the first memory block; counting the number of program operations, among the first program operations, in which a ratio of dummy data to program data for each of the first program operations is greater than or equal to a first threshold value; determining whether the counted number of program operations is greater than or equal to a second threshold value; and when it is determined that the counted number of program operations is greater than or equal to the second threshold value, performing a second program operation on the second memory block.

BRIEF DESCRIPTION OF THE DRAWINGS

Example embodiments will now be described more fully hereinafter with reference to the accompanying drawings; however, the example embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Like reference numerals refer to like elements throughout.

FIG. 1 is a diagram illustrating a memory system in accordance with an embodiment of the present disclosure.

FIG. 2 is a diagram illustrating a memory controller in accordance with an embodiment of the present disclosure.

FIG. 3 is a flowchart illustrating a process of programming program data in accordance with an embodiment of the present disclosure.

FIG. 4 is a diagram illustrating a process of programming program data in accordance with an embodiment of the present disclosure.

FIG. 5 is a flowchart illustrating a process of changing a program mode in accordance with an embodiment of the present disclosure.

FIG. 6 is a diagram illustrating a process of changing a program mode in accordance with an embodiment of the present disclosure.

FIG. 7 is a diagram illustrating a memory controller in accordance with an embodiment of the present disclosure.

FIG. 8 is a diagram illustrating a process of changing a program mode in accordance with an embodiment of the present disclosure.

FIG. 9 is a diagram illustrating a memory device in accordance with an embodiment of the present disclosure.

FIG. 10 is a diagram illustrating an example of a memory block.

FIG. 11 is a diagram illustrating an example of a memory block having a three-dimensional structure.

Figure 12:
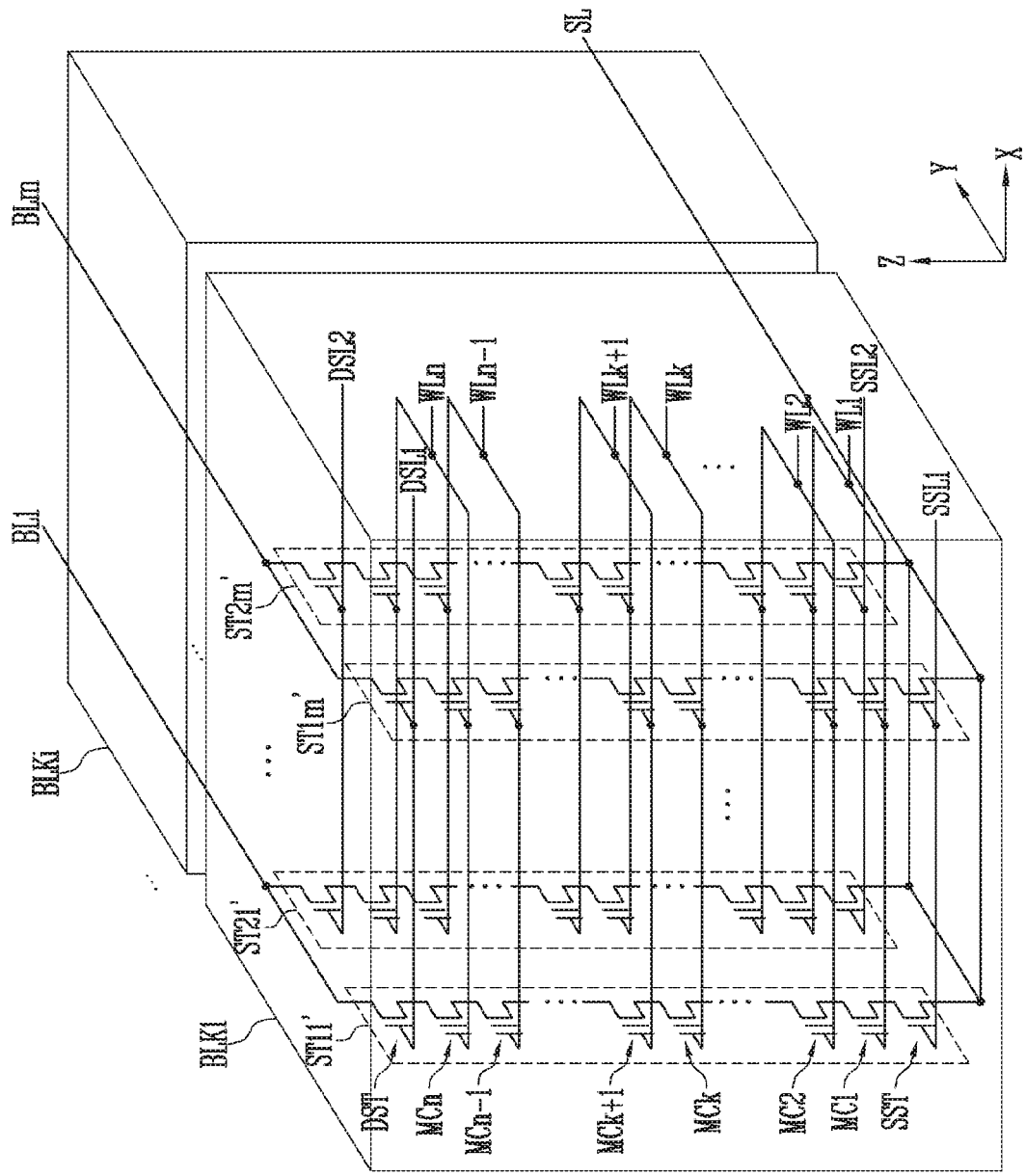

FIG. 12 is a diagram illustrating another example of a memory block having a three-dimensional structure.

Figure 1:
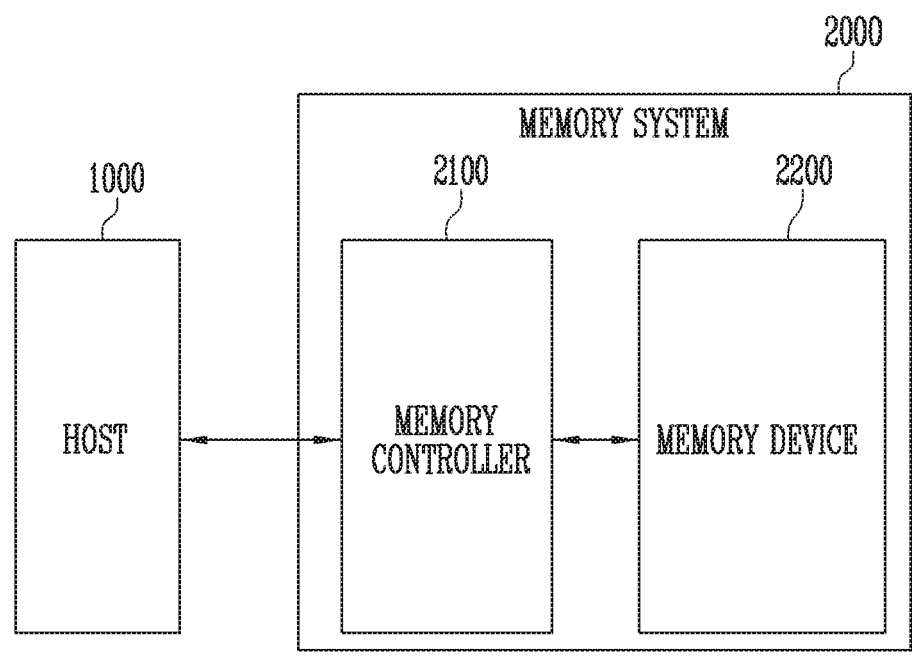
Figure 2:
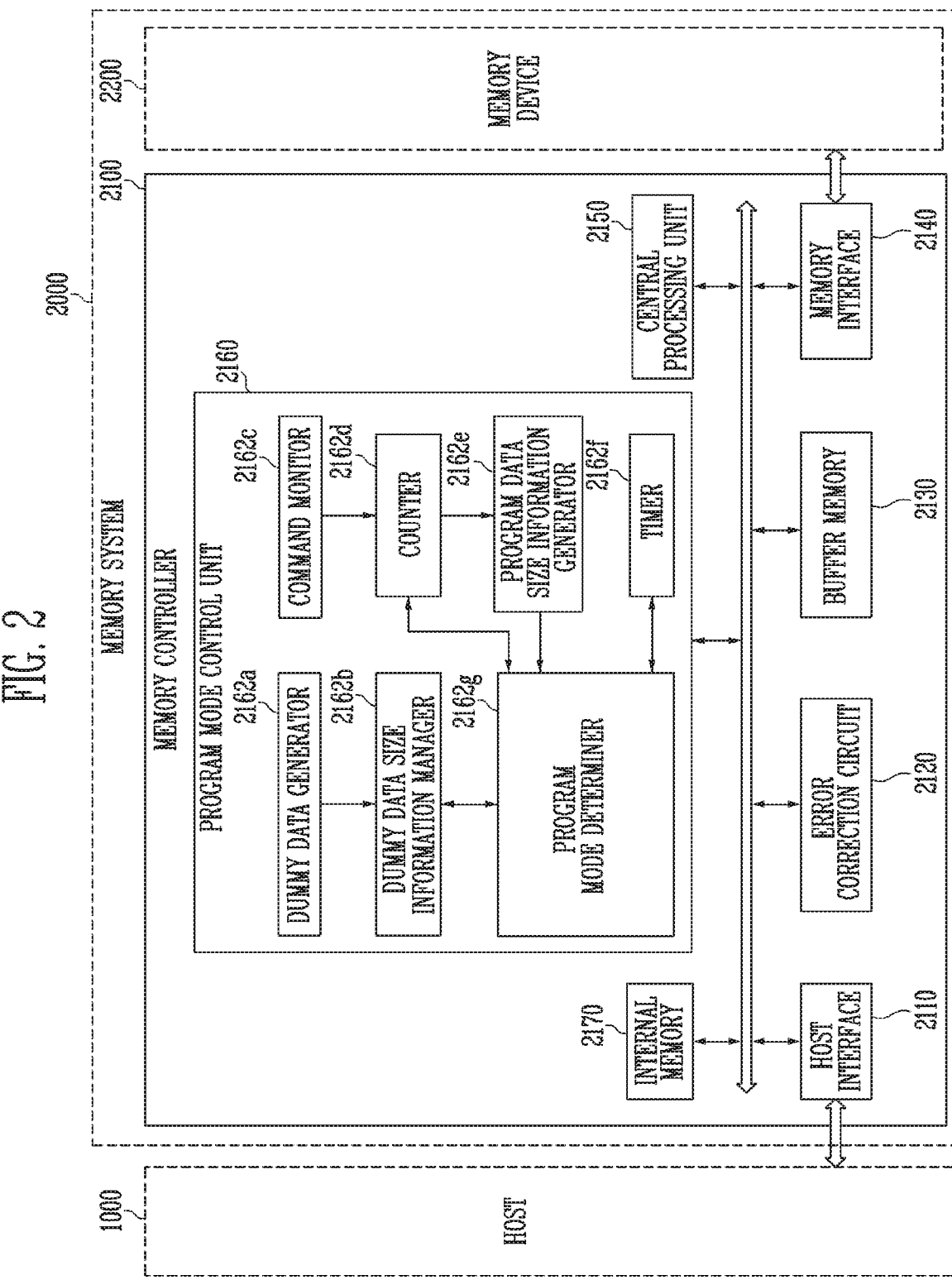
Figure 7:
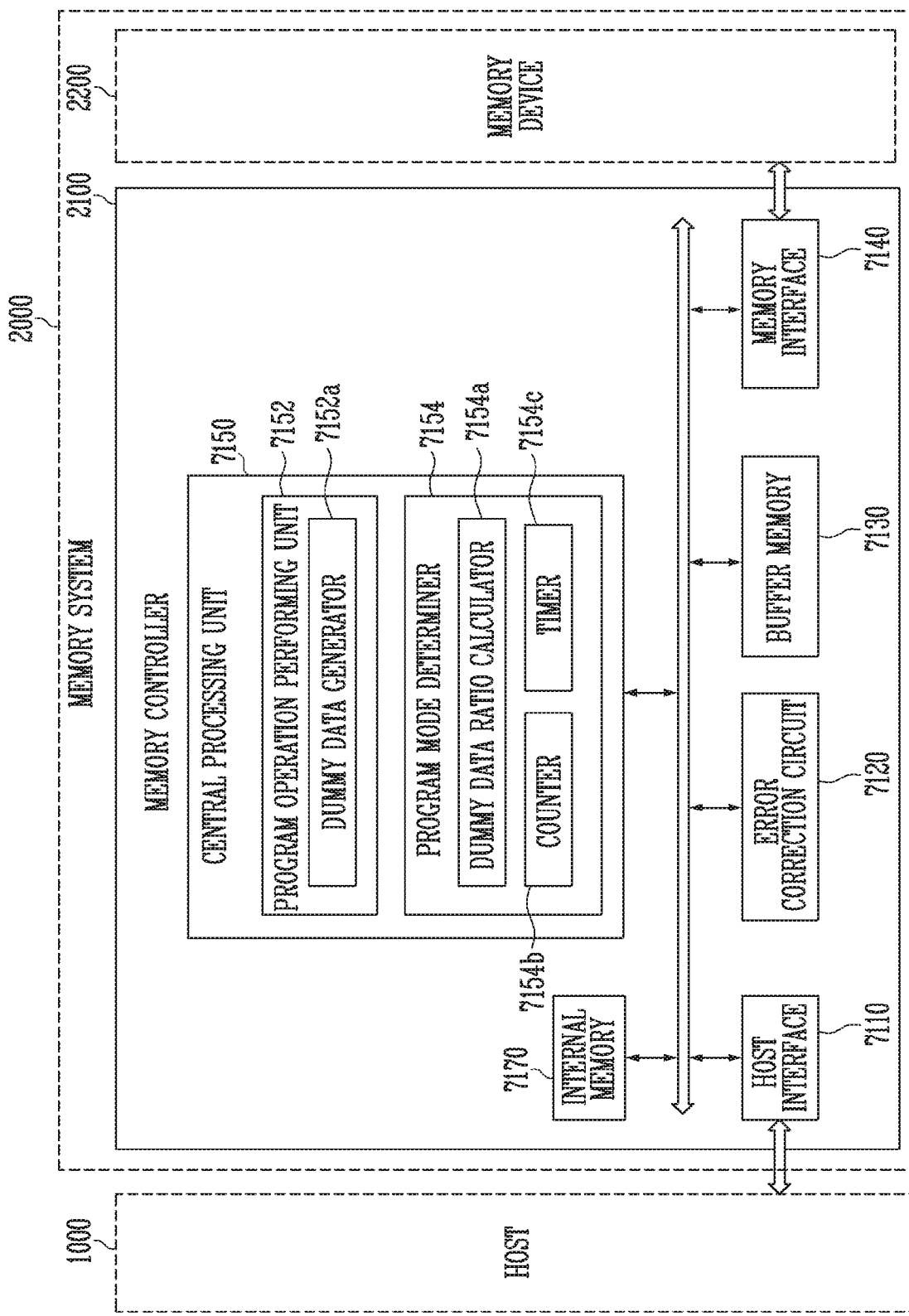

FIGS. 13 to 16 are diagrams illustrating other examples of the memory system including the memory controller shown in FIGS. 1, 2 and 7.

DETAILED DESCRIPTION

In the present disclosure, advantages, features and methods for achieving the advantages and features will become more apparent after reading the following exemplary embodiments taken in conjunction with the drawings. The present disclosure may, however, be embodied in different forms and should not be construed as being limited to the embodiments set forth herein. Rather, these embodiments are provided to describe the present disclosure in detail to the extent that those skilled in the art to which the disclosure pertains may easily enforce the technical concept of the present disclosure.

In the entire specification, when an element is referred to as being "connected" or "coupled" to another element, it can be directly connected or coupled to the another element or be indirectly connected or coupled to another element with one or more intervening elements interposed therebetween. In addition, when an element is referred to as "including" a component, this indicates that the element may further include another component instead of excluding another component unless there is different disclosure.

Hereinafter, exemplary embodiments of the present disclosure will be described with reference to the accompanying drawings.

FIG. 1 is a diagram illustrating a memory system 2000 in accordance with an embodiment of the present disclosure.

Referring to FIG. 1, the memory system 2000 may include a memory controller 2100 and a memory device 2200 for storing data. The memory controller 2100 may control the memory device 2200 under the control of a host 1000.

The host 1000 may communicate with the memory system 2000, using at least one interface protocol among a Non-Volatile Memory express (NVMe), a Peripheral Component Interconnect-Express (PCI-e or PCIe), an Advanced Technology Attachment (ATA), a Serial ATA (SATA), a Parallel ATA (PATA), a Universal Serial Bus (USB), a Multi-Media Card (MMC), an Enhanced Small Disk Interface (ESDI), an Integrated Drive Electronics (IDE), a Mobile Industry Processor Interface (MIPI), a Universal Flash Storage (UFS), a Small Computer Small Interface (SCSI), and a Serial Attached SCSI (SAS). However, embodiments of the present disclosure are not limited thereto.

The memory controller 2100 may control overall operations of the memory system 2000, and control data exchange between the host 1000 and the memory device 2200. In a program operation, the memory controller 2100 may transmit a command, an address and data to the memory device 2200. In a read operation, the memory controller 2100 may transmit a command and an address to the memory device 2200, and receive read data from the memory device 2200. In an erase operation, the memory controller 2100 may transmit a command and an address to the memory device 2200.

The memory device 2200 may be configured as a volatile memory device in which stored data disappears when the supply of power is interrupted or a nonvolatile memory device in which stored data is retained even when the supply of power is interrupted. The memory device 2200 may perform a program operation, a read operation, and an erase operation under the control of the memory controller 2100. The memory device 2200 may include a plurality of memory blocks for storing data. The plurality of memory blocks may be classified into single level cell (SLC) blocks and multi level cell (MLC) blocks according to the number of bits of data stored in a memory cell. The SLC block may be a block driven in a manner that stores data of 1 bit in one memory cell. The MLC block may be a block driven in a manner that store data of 2 bits or more in one memory cell. That is, the memory device 2200 may include at least one of an m-bit MLC block and an SLC block. m-bit data may be programmed in each of memory cells included in the m-bit MLC block, and 1-bit data may be programmed in each of memory cells included in the SLC block. Here, 'm' may be a natural number of 2 or more. When the m-bit MLC block is programmed, the memory device 2200 may program program data corresponding to m logical pages received from the memory controller 2100 to one selected physical page. For example, the m-bit MLC block may be 2-bit MLC block in which program data corresponding to two logical pages are programmed to one physical page. For example, the m-bit MLC block may be a 3-bit MLC block, i.e., a triple level cell (TLC) block in which program data corresponding to three logical pages are programmed to one physical page. For example, the m-bit MLC block may be a 4-bit MLC block, i.e., a quad level cell (QLC) block in which program data corresponding to four logical pages are programmed to one physical page.

FIG. 2 is a diagram illustrating a memory controller 2100 in accordance with an embodiment of the present disclosure, for example, the memory controller 2100 shown in FIG. 1.

Referring to FIG. 2, the memory controller 2100 may include a host interface 2110, an error correction circuit 2120, a buffer memory 2130, a memory interface 2140, a central processing unit 2150, a program mode control unit 2160, and an internal memory 2170. The host interface 2110, the error correction circuit 2120, the buffer memory 2130, the memory interface 2140, the program mode control unit 2160, and the internal memory 2170 may be controlled by the central processing unit 2150.

The host interface 2110 may exchange data with the host 1000, using various interface protocols. For example, the host interface 2110 may communicate with the host 1000, using at least one interface protocol among a Non-Volatile Memory express (NVMe), a Peripheral Component Interconnect-Express (PCI-e or PCIe), an Advanced Technology Attachment (ATA), a Serial ATA (SATA), a Parallel ATA (PATA), a Universal Serial Bus (USB), a Multi-Media Card (MMC), an Enhanced Small Disk Interface (ESDI), an Integrated Drive Electronics (IDE), a Mobile Industry Processor Interface (MIPI), a Universal Flash Storage (UFS), a Small Computer Small Interface (SCSI), and a Serial Attached SCSI (SAS). However, embodiments of the present disclosure are not limited thereto.

The host interface 2110 may receive a program request and user data corresponding to the program request from the host 1000, The host interface 2110 may transfer the program request to the central processing unit 2150, and transfer the user data to the buffer memory 2130.

The error correction circuit 2120 may perform error correction encoding in a program operation. The error correction circuit 2120 may perform error correction decoding in a read operation.

The buffer memory 2130 may temporarily store data while the memory controller 2100 is controlling the memory device 2200. For example, the buffer memory 2130 may temporarily store the user data received from the host 1000 until a program operation is completed. For example, the buffer memory 2130 may temporarily store merge data that is data obtained by combining dummy data with the user data received from the host 1000 until the program operation is completed. Also, the buffer memory 2130 may temporarily store data read from the memory device 2200.

The memory interface 2140 may communicate with the memory device 2200, using various interface protocols.

The central processing unit 2150 may perform various calculations or generate a command and an address to control the memory device 2200. For example, the central processing unit 2150 may generate various commands necessary for a program operation, a read operation, and an erase operation.

The central processing unit 2150 may translate a logical address received from the host 1000 into a physical address to control an operation of the memory device 2200. The central processing unit 2150 may translate a logical address into a physical address or translate a physical address into a logical address, using an address mapping table stored in the internal memory 2170. The central processing unit 2150 may update the address mapping table when new data is programmed to the memory device 2200 or when data stored in the memory device 2200 is erased.

The central processing unit 2150 may perform a program operation on the memory device 2200 while changing a program mode. For example, the central processing unit 2150 may perform the program operation by using a first program mode among a plurality of program modes or perform the program operation by using a second program mode among the plurality of program modes in response to a signal received from the program mode control unit 2160.

Hereinafter, among the program modes used by the central processing unit 2150, the first program mode is an n-bit MLC mode and the second program mode is an m-bit MLC mode or an SLC mode, Here, m and n may be natural numbers, and 2≤m<n. For example, when the first program mode is a 2-bit MLC mode, the second program mode may be the SLC mode. When the first program mode is a 3-bit MLC mode, the second program mode may be the 2-bit MLC mode or the SLC mode.

The central processing unit 2150 may perform the program operation on the memory device 2200 by using the first program mode. That is, the central processing unit 2150 may program program data to the memory device 2200 by using the first program mode. In other words, the central processing unit 2150 may program the program data in a memory block, i.e., an n-bit MLC block, which corresponds to the first program mode, among the plurality of memory blocks included in the memory device 2200.

When a signal instructing a program mode of the memory device to be changed to the second program mode is received from the program mode control unit 2160 while performing the program operation by using the first program mode, the central processing unit 2150 may change the first program mode to the second program mode. That is, the central processing unit 2150 may program subsequent program data to the memory device 2200 by using the second program mode. In other words, the central processing unit 2150 may program the program data in a memory block, i.e., an m-bit MLC block or SLC block, which corresponds to the second program mode, among the plurality of memory blocks included in the memory device 2200.

When a signal instructing a program mode of the memory device to be changed to the first program mode is received from the program mode control unit 2160 while performing the program operation by using the second program mode, the central processing unit 2150 may change the second program mode to the first program mode. That is, the central processing unit 2150 may program subsequent program data to the memory device 2200 by using the first program mode.

When user data is stored (or filled) by a size corresponding to a current program mode in the buffer memory 2130, the central processing unit 2150 may program the user data stored in the buffer memory 2130 to the memory device 2200. The user data stored by the size corresponding to the current program mode may be referred to as program data. For example, when the central processing unit 2150 performs the program operation by using an n-bit MLC mode, the program data may have a size corresponding to n logical pages. For example, when the central processing unit 2150 performs the program operation by using an m-bit MLC mode, the program data may have a size corresponding to m logical pages. For example, when the central processing unit 2150 performs the program operation by using the SLC mode, the program data may have a size corresponding to one physical page.

Even when user data is not stored by the size corresponding to the current program mode in the buffer memory 2130, the central processing unit 2150 may program the user data stored in the buffer memory 2130 to the memory device 2200 when a flush event occurs. For example, when a flush request is received from the host 1000 or when it is autonomously determined that a flush is required, the central processing unit 2150 may program the user data stored in the buffer memory 2130 to the memory device 2200. The central processing unit 2150 may control a dummy data generator 2162a such that merge data can be generated by adding dummy data to the user data stored in the buffer memory 2130, and program the generated merge data to the memory device 2200. The merge data may have a size corresponding to the current program mode. Therefore, the merge data may be referred to as the program data.

Since the merge data includes the dummy data in addition to the user data, write amplification (WA) is caused when the merge data is programmed. A degree of the WA is determined according to an amount of unnecessary data, i.e., dummy data, except for the user data corresponding to the program request from the host 1000 when the merge data is programmed. For example, Equation 1 shows an example of calculating a degree of the WA. According to Equation 1, it can be seen that the degree of the WA increases when the amount of dummy data increases.

$$WA = \frac{userdata + \text{dummy data}}{\text{user data}} \qquad \text{Equation 1}$$

In general, it is known that, when the WA decreases, a program/erase (P/E) cycle decreases, and accordingly, the lifespan of the memory device 2200 increases. Thus, the program mode control unit 2160 controls a program mode of the memory device 2200 when the WA excessively occurs, so that the WA may be decreased. The program mode control unit 2160 will be described in detail as follows.

The program mode control unit 2160 may determine a program mode of the memory device 2200 and instruct the central processing unit 2150 to perform a program operation by using the determined program mode. For example, the program mode control unit 2160 may instruct the central processing unit 2150 to perform the program operation by the first program mode, or instruct the central processing unit 2150 to perform the program operation by the second program mode.

In an embodiment, when the central processing unit 2150 performs the program operation by using the first program mode, the program mode control unit 2160 may determine whether a program mode of the memory device 2200 is to be changed to the second program mode according to a ratio of dummy data among program data programmed by using the first program mode. When the program mode control unit 2160 determines that the program mode is to be changed to the second program mode, the program mode control unit 2160 may instruct the central processing unit 2150 to program subsequent program data by using the second program mode.

In an embodiment, when the central processing unit 2150 performs the program operation by using the second program mode, the program mode control unit 2160 may determine that the second program mode is to be changed to the first program mode whenever a set time elapses or whenever program data are programmed by a set size. When the program mode control unit 2160 determines that the second program mode is to be changed to the first program mode, the program mode control unit 2160 may instruct the central processing unit 2150 to program subsequent program data by using the first program mode.

The program mode control unit 2160 may include the dummy data generator 2162a, a dummy data size information manager 2162b, a command monitor 2162c, a counter 2162d, a program data size information generator 2162e, a timer 2162f, and a program mode determiner 2162g.

When a dummy data generation request for requesting the dummy data generator 2162a to generate dummy data is received from the central processing unit 2150, the dummy data generator 2162a may generate dummy data and transmit the generated dummy data to the buffer memory 2130. Accordingly, the buffer memory 2130 may store merge data obtained by combining the dummy data with user data. The dummy data generation request may include size information of the dummy data to be generated. The dummy data generator 2162a may generate dummy data in response to the dummy data generation request, and transmit size information of the generated dummy data to the dummy data size information manager 2162b.

The dummy data size information manager 2162b may accumulate and manage size information of dummy data received from the dummy data generator 2162a. That is, whenever size information of dummy data is received from the dummy data generator 2162a, the dummy data size information manager 2162b may accumulate the received size information of the dummy data, thereby updating the size information of the dummy data.

When there is a request from the program mode determiner 2162g, the dummy data size information manager 2162b may provide size information of dummy data to the program mode determiner 2162g.

When the size information of the dummy data is provided to the program mode determiner 2162g, the size information of the dummy data accumulated in the dummy data size information manager 2162b may be initialized. The size information of the dummy data accumulated in the dummy data size information manager 2162b may be autonomously initialized by the dummy data size information manager 2162b, or be initialized under the control of the program mode determiner 2162g.

The command monitor 2162c may monitor commands output from the central processing unit 2150. The command monitor 2162c may increase a count value of the counter 2162d by 1 whenever a program command is output from the central processing unit 2150.

The program data size information generator 2162e may generate size information of program data programmed using the first program mode, by multiplying a program unit corresponding to a current program mode by the count value of the counter 2162d. For example, when the current program mode is an n-bit MLC mode, the program unit may correspond to n logical pages stored in one physical page. When the current program mode is an m-bit MLC mode, the program unit may correspond to m logical pages stored in one physical page. When the current program mode is the SLC mode, the program unit may correspond to one physical page.

When there is a request from the program mode determiner 2162g, the program data size information generator 2162e may generate size information of the program data, and provide the generated size information of the program data to the program mode determiner 2162g. When the size information of the program data is provided to the program mode determiner 2162g, the count value of the counter 2162d may be initialized. The count value of the counter 2162d may be initialized by the program data size information generator 2162e or the program mode determiner 2162g.

The program mode determiner 2162g may calculate a ratio of dummy data among program data programmed to the memory device 2200, based on the size information of the dummy data and the size information of the program data.

In an embodiment, when the central processing unit 2150 performs the program operation by using the first program mode, the program mode determiner 2162g may calculate a ratio of dummy data for every first time period.

In an embodiment, when the central processing unit 2150 performs the program operation by using the first program mode, the program mode determiner 2162g may calculate a ratio of dummy data whenever program data are programmed by a set size to the memory device 2200. For example, the central processing unit 2150 may output one program command whenever one program data is programmed. Therefore, whether the program data have been programmed by the set size may be checked by counting the number at which the program command is output. For example, when the count value of the counter 2162d reaches a first count value, it may be determined that the program data have been programmed by the set size.

When a timer value of the timer 2162f reaches a first timer value or when the count value of the counter 2162d reaches the first count value, the program mode determiner 2162g may request the dummy data size information manager 2162b to transmit size information of dummy data, and request the program data size information generator 2162e to transmit size information of program data.

The program mode determiner 2162g may calculate a ratio of dummy data among program data, based on the size information of the dummy data and the size information of the program data. The size information of the dummy data may be received from the dummy data size information manager 2162b. The size information of the program data may be received from the program data size information generator ifs 2162e.

When the ratio of the dummy data is calculated, the program mode determiner 2162g may initialize at least one of the size information of the dummy data, the count value of the counter 2162d, and the timer value of the timer 2162f. The size information of the dummy data may be managed by the dummy data size information manager 2162b.

The program mode determiner 2162g may determine that a program mode of the memory device 2200 is to be changed to the second program mode when the calculated ratio of the dummy data exceeds a threshold value. Accordingly, the program mode determiner 2162g may instruct the central processing unit 2150 to program subsequent program data by using the second program mode.

In an embodiment, when a second time period elapses after the program mode is changed to the second program mode, the program mode determiner 2162g may determine that the second program mode is to be changed to the first program mode. For example, when the timer value of the timer 2162f reaches a second timer value after the program mode is changed to the second program mode, the program mode determiner 2162g may determine that the second program mode is to be changed to the first program mode. The second timer value may be equal to or different from the first timer value.

In an embodiment, when program data are programmed by a set size to the memory device 2200 after the program mode is changed to the second program mode, the program mode determiner 2162g may determine that the program mode is to be changed to the first program mode. For example, when the count value of the counter 2162d reaches a second count value after the program mode is changed to the second program mode, the program mode determiner 2162g may determine that the second program mode is to be changed to the first program mode. The second count value may be equal to or different from the first count value.

After the second program mode is changed to the first program mode, the program mode determiner 2162g may initialize at least one of the timer value of the timer 2162f and the count value of the counter 2162d.

The internal memory 2170 may be used as a storage for storing various information necessary for an operation of the memory controller 2100. The internal memory 2170 may store a plurality of tables. For example, the internal memory 2170 may store an address mapping table in which logical and physical addresses are mapped.

Figure 3:
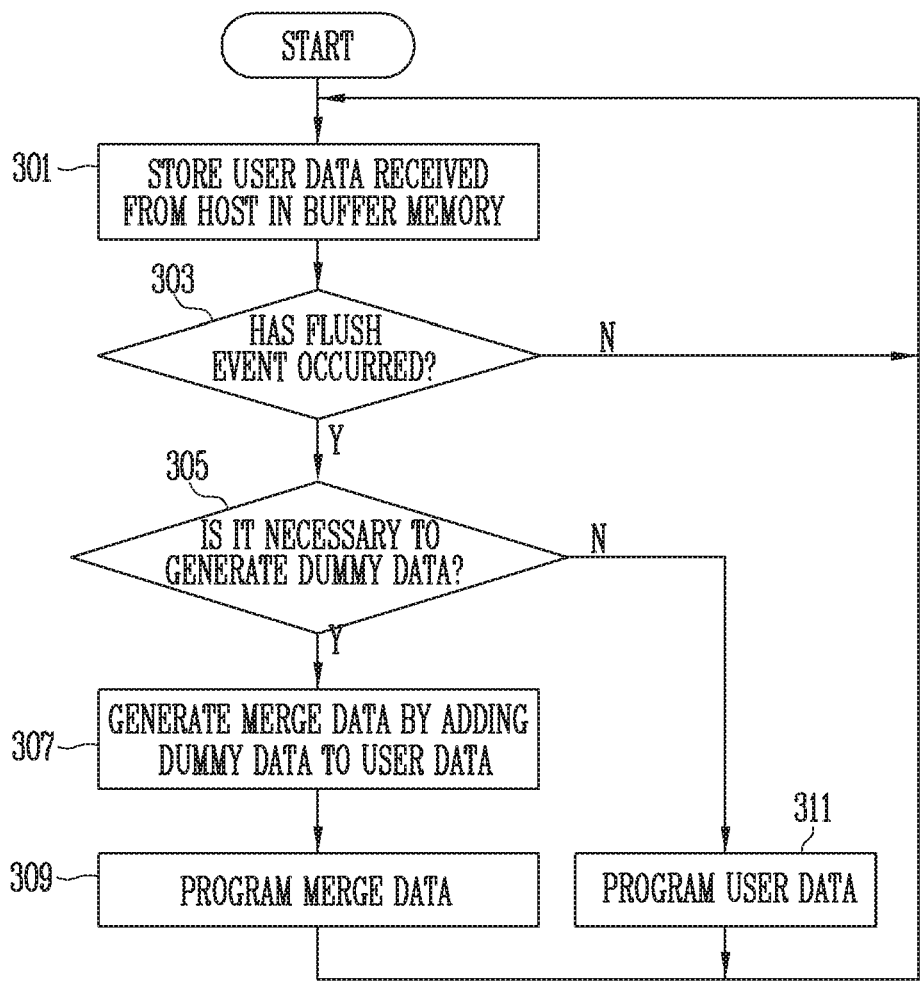

FIG. 3 is a flowchart illustrating a process of programming program data in accordance with an embodiment of the present disclosure.

In some embodiments, at least one of steps shown in FIG. 3 may be omitted, and the order of the steps may be changed. The process of FIG. 3 may be performed by the memory controller 2100 of FIG. 2.

Referring to FIG. 3, at step 301, the memory controller 2100 may receive user data from the host 1000, and store the received user data in the buffer memory 2130.

At step 303, the memory controller 2100 may check whether a flush event has occurred. The flush event may occur when it is necessary to program the user data stored in the buffer memory 2130 to the memory device 2200. For example, the flush event may occur in response to a request from the host 1000, or occur based on an autonomous determination of the memory controller 2100. When it is determined that the flush event occurs (step 303, Y), step 305 may be performed. When it is determined that the flush event does not occur (step 303, N), the step 301 may be performed.

At the step 305, the memory controller 2100 may determine whether it is necessary to generate dummy data. For example, when the user data stored in the buffer memory 2130 does not have a size corresponding to a program unit corresponding to a current program mode, the memory controller 2100 may determine that it is necessary to generate dummy data. For example, when the user data stored in the buffer memory 2130 has a size corresponding to the program unit corresponding to the current program mode, the memory controller 2100 may determine that it is unnecessary to generate dummy data. When it is determined that it is necessary to generate dummy data (step 305, Y), step 307 may be performed. When it is determined that it is unnecessary to generate dummy data (step 305, N), step 311 may be performed.

At the step 307, the memory controller 2100 may generate merge data by adding dummy data to the user data. For example, the memory controller 2100 may add dummy data to the user data such that the merge data can be generated to have the size corresponding to the program unit corresponding to the current program mode.

At step 309, the memory controller 2100 may program the merge data to the memory device 2200.

Moreover, at the step 311, the memory controller 2100 may program the user data to the memory device 2200.

Figure 4:
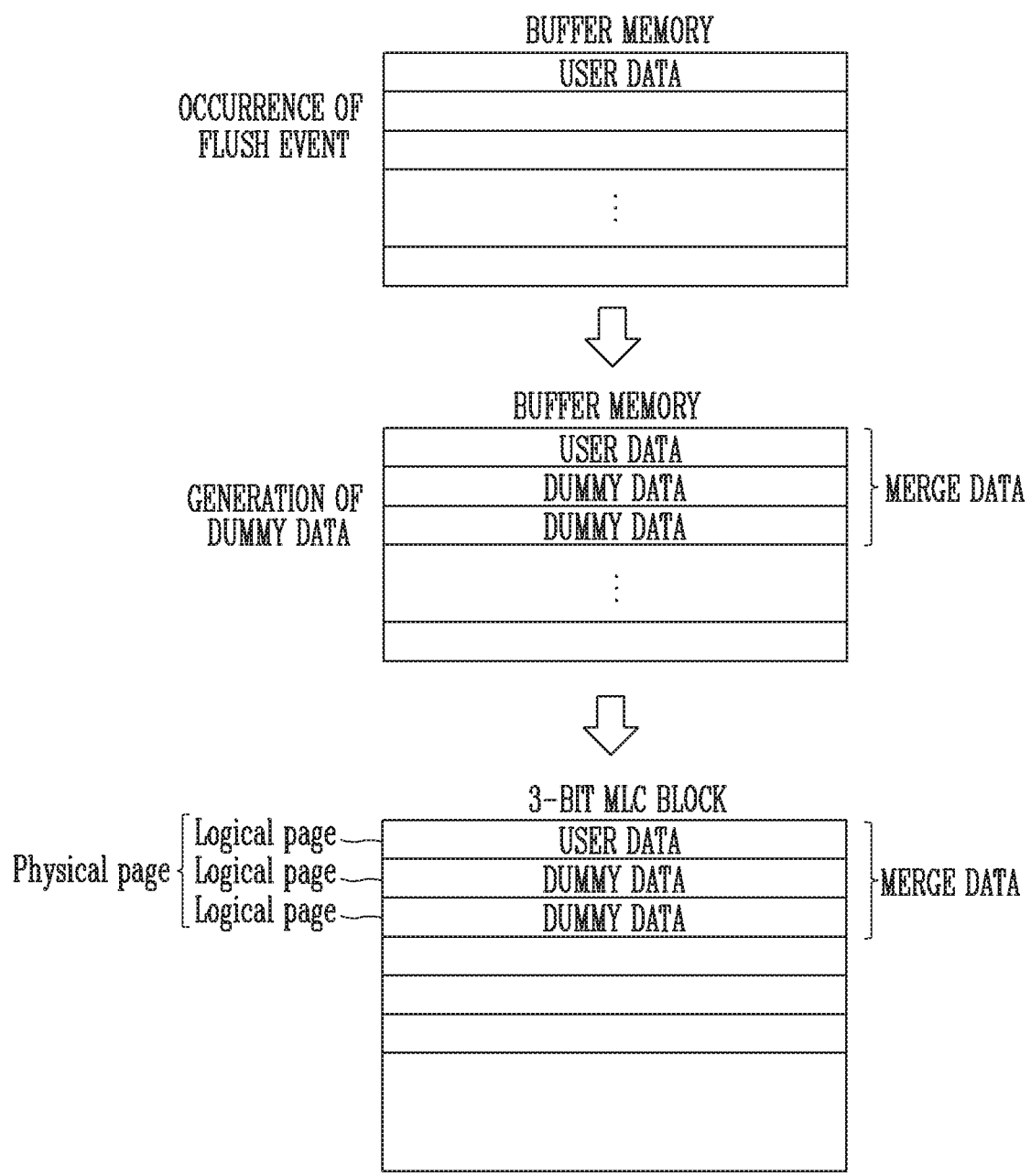

FIG. 4 is a diagram illustrating a process of programming program data in accordance with an embodiment of the present disclosure. The process of FIG. 4 may be performed by the memory controller 2100 of FIG. 2.

In the embodiment described with reference to FIG. 4, a current program mode is a 3-bit MLC mode, and user data USER DATA is stored in the buffer memory 2130. The user data USER DATA has a length corresponding to one logical page.

When a flush event occurs, the memory controller 2100 may generate merge data MERGE DATA having a size corresponding to a program unit corresponding to the current program mode. In the example shown in FIG. 4, since the current program mode is the 3-bit MLC mode, the memory controller 2100 may generate the merge data MERGE DATA by adding, to the user data USER DATA, dummy data DUMMY DATA corresponding to two logical pages. Also, the memory controller 2100 may program the generated merge data MERGE DATA in a 3-bit MLC block.

Referring to FIG. 4, it can be seen that the merge data MERGE DATA has been programmed to one physical page of the 3-bit MLC block.

Figure 5:
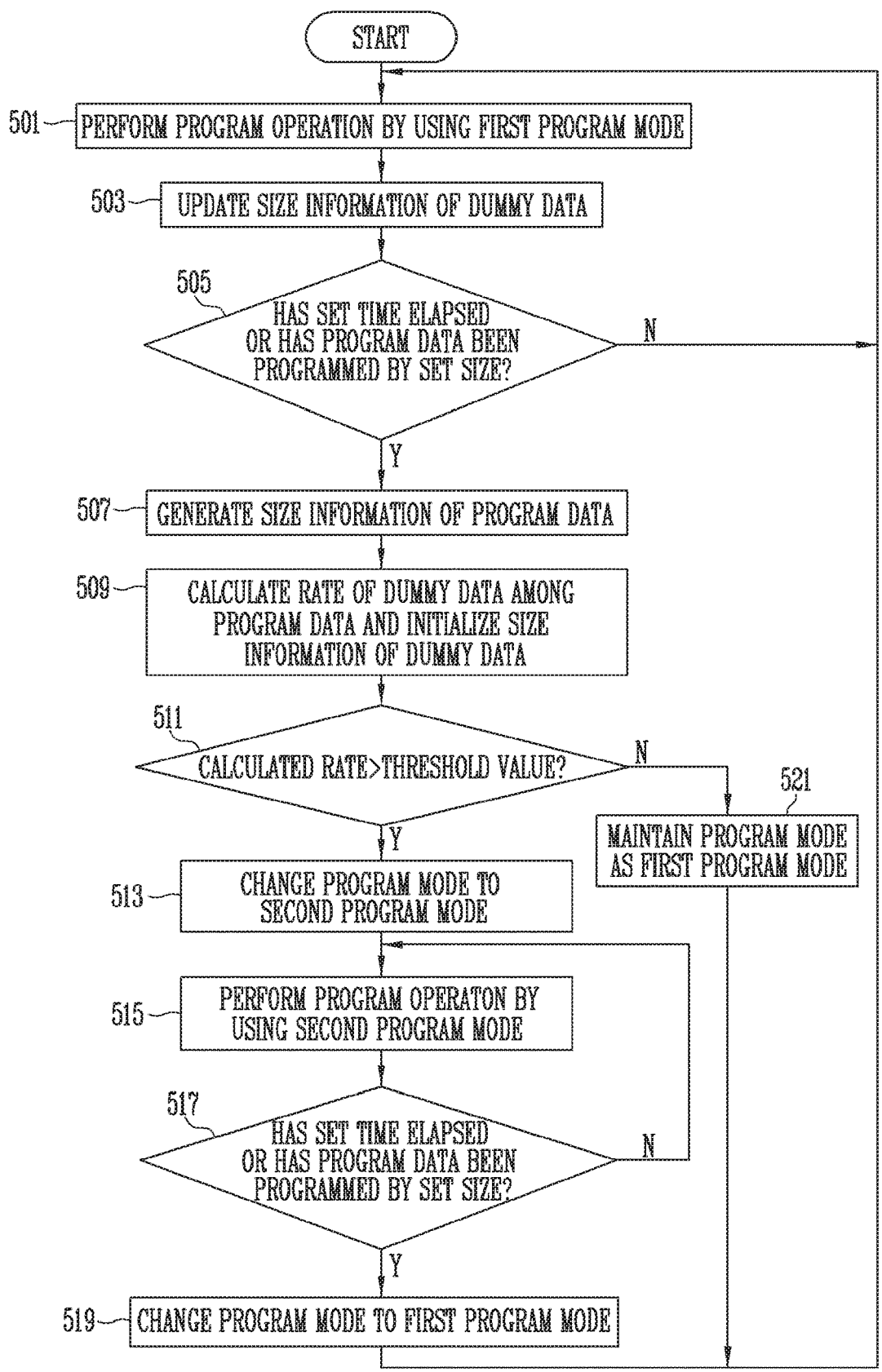

FIG. 5 is a flowchart illustrating a process of changing a program mode in accordance with an embodiment of the present disclosure.

At least one of the steps shown in FIG. 5 may be performed while the steps shown in FIG. 3 are being performed. In some embodiments, at least one of the steps shown in FIG. 5 may be omitted, and the order of the steps may be changed. The process of FIG. 5 may be performed by the memory controller 2100 of FIG. 2.

Referring to FIG. 5, at step 501, the memory controller 2100 may perform a program operation by using a first program mode. For example, the memory controller 2100 may program user data stored in the buffer memory 2130 to the memory device 2200. In an embodiment, when the user data stored in the buffer memory 2130 does not have a size corresponding to a program unit for the first program mode, the memory controller 2100 may generate merge data having the size corresponding to the program unit for the first program mode by adding dummy data to the user data. Also, the memory controller 2100 may program the generated merge data to the memory device 2200. The programmed merge data may be referred to as program data. In an embodiment, when the user data stored in the buffer memory 2130 has the size corresponding to the program unit for the first program mode, the memory controller 2100 may program the user data to the memory device 2200. The programmed user data may be referred to as program data.

At step 503, the memory controller 2100 may update size information of dummy data. For example, when dummy data is generated at the step 501, the memory controller 2100 may accumulate size information of the generated dummy data, thereby updating the size information of the dummy data.

At step 505, the memory controller 2100 may check whether a set time has elapsed or whether program data have been programmed by a set size from when the program operation is started using the first program mode. For example, the memory controller 2100 may check whether a timer value of the timer 2162$f$ has reached a first timer value or whether a count value of the counter 2162$d$ has reached a first count value. When it is determined that the set time elapses or when the program data are programmed by the set size (step 505, Y), step 507 may be performed. When it is determined that the set time did not elapse or when the program data are not programmed by the set size (step 505, N), the step 501 may be performed.

At the step 507, the memory controller 2100 may generate size information of the program data programmed to the memory device 2200. For example, the memory controller 2100 may generate the size information of the program data programmed to the memory device 2200 by multiplying the program unit corresponding to the first program mode and the first count value.

At step 509, the memory controller 2100 may calculate a ratio of dummy data among the program data programmed to the memory device 2200. That is, the memory controller 2100 may calculate the ratio of the dummy data, based on the size information of the program data and the size information of the dummy data. Also, the memory controller 2100 may initialize at least one of the size information of the dummy data, the timer value, and the count value.

At step 511, the memory controller 2100 may determine whether the calculated ratio of the dummy data exceeds a set threshold value. When it is determined that the ratio of the dummy data exceeds the threshold value (step 511, Y), step 513 may be performed. When it is determined that the ratio of the dummy data does not exceed the threshold value (step 511, N), step 521 may be performed.

At the step 513, the memory controller 2100 may change a program mode of the memory device 2200 to a second program mode.

At step 515, the memory controller 2100 may perform the program operation by using the second program mode.

At step 517, the memory controller 2100 may check whether a set time has elapsed or whether program data have been programmed by a set size from when the program operation was started using the second program mode. For example, the memory controller 2100 may check whether the timer value of the timer 2162$f$ has reached a second timer value or whether the count value of the counter 2162$d$ has reached a second count value. When it is determined that the set time elapsed or when the program data are programmed by the set size (step 517, Y), step 519 may be performed. When it is determined that the set time did not elapse or when the program data are not programmed by the set size (step 517, N), the step 515 may be performed.

At the step 519, the memory controller 2100 may change the second program mode to the first program mode. The memory controller 2100 may initialize at least one of the timer value and the count value. Subsequently, the step 501 may be performed.

Furthermore, at the step 521, the memory controller 2100 may maintain the program mode as the first program mode. The memory controller 2100 may initialize at least one of the timer value and the count value. Subsequently, the step 501 may be performed.

Figure 6:
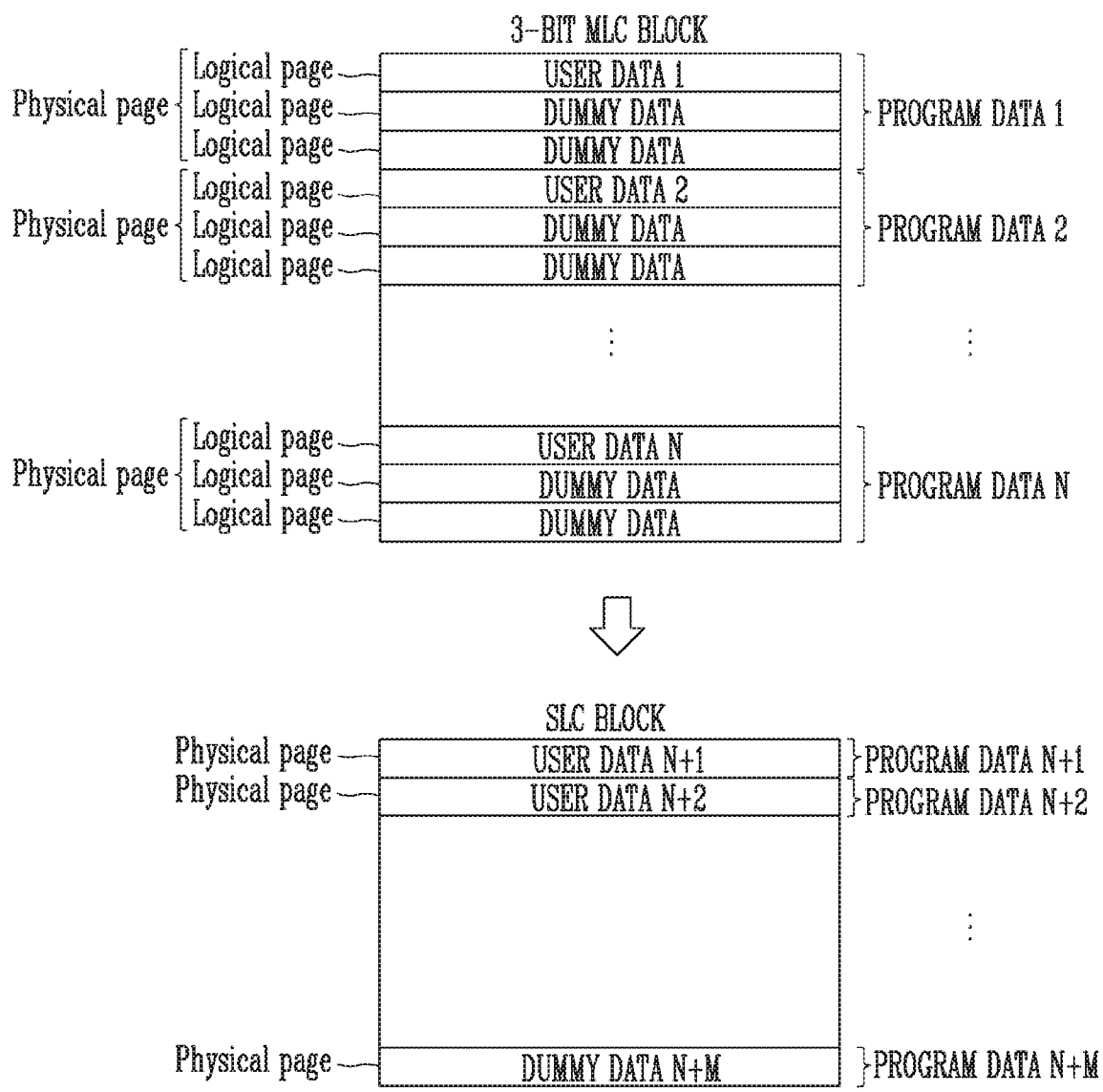

FIG. 6 is a diagram illustrating a process of changing a program mode in accordance with an embodiment of the present disclosure. The process of FIG. 6 may be performed by the memory controller 2100 of FIG. 2.

In the embodiment described with reference to FIG. 6, it is illustrated a case where a current program mode is a 3-bit MLC mode. In the 3-bit MLC mode, program data may be programmed in a 3-bit MLC block. FIG. 6 illustrates an example in which N program data PROGRAM DATA 1, PROGRAM DATA 2, . . . , and PROGRAM DATA N are programmed in the 3-bit MLC block. Also, FIG. 6 illustrates a case in which each of the program data PROGRAM DATA 1, PROGRAM DATA 2, . . . , and PROGRAM DATA N includes user data USER DATA corresponding to one logical page and dummy data DUMMY DATA corresponding to two logical pages.

When the program data PROGRAM DATA 1, PROGRAM DATA 2, . . . , and PROGRAM DATA N are programmed during a set time period or correspond to a set size, the memory controller 2100 may calculate a ratio at which the dummy data DUMMY DATA occupy among the program data PROGRAM DATA 1, PROGRAM DATA 2, . . . , and PROGRAM DATA N. In the example shown in FIG. 6, it can be seen that the ratio of the dummy data is ⅔. When the set threshold value is ½, the memory controller 2100 may change a program mode of the memory device to a 2-bit MLC mode or an SLC mode, and perform the program operation by using the changed mode. FIG. 6 illustrates an example in which subsequent program data PROGRAM DATA (N+1), PROGRAM DATA (N+2), . . . , and PROGRAM DATA (N+M) are programmed in an SLC block. Subsequently, when the set time period elapses again or when program data corresponding to the set size are programmed again, the memory controller 2100 may change the program mode to the 3-bit MLC mode.

FIG. 7 is a diagram illustrating a memory controller 2100 in accordance with an embodiment of the present disclosure. The memory controller 2100 and the memory device 2200 may be included in the memory system 2000 as shown in FIG. 7. The memory controller 2100 may be coupled between the host 1000 and the memory device 2200.

Referring to FIG. 7, the memory controller 2100 may include a host interface 7110, an error correction circuit 7120, a buffer memory 7130, a memory interface 7140, a central processing unit 7150, and an internal memory 7170.

Operations of the host interface 7110, the error correction circuit 7120, the buffer memory 7130, the memory interface 7140, and the internal memory 7170 are respectively identical to those of the host interface 2110, the error correction circuit 2120, the buffer memory 2130, the memory interface 2140, and the internal memory 2170, as shown in FIG. 2. Thus, overlapped descriptions thereof will be omitted.

The central processing unit 7150 may perform a program operation on the memory device 2200. During the program operation, the central processing unit 7150 may change a program mode. For example, the central processing unit 7150 may perform the program operation by a first program mode (e.g., an n-bit MLC mode for storing n bits of data per cell), or perform the program operation by using a second program mode (e.g., an m-bit MLC mode for storing m bits of data per cell or SLC mode for storing one bit of data per cell). Here, m and n may be natural numbers, and 2≤m<n.

When the first program mode is used, the central processing unit 7150 may program program data in a memory block (e.g., an n-bit MLC block) corresponding to the first program mode among the plurality of memory blocks of the memory device 2200.

When the second program mode is used, the central processing unit 7150 may program program data in a memory block (e.g, an m-bit MLC block or SLC block) corresponding to the second program mode among the plurality of memory blocks of the memory device 2200.

The central processing unit 7150 may include a program operation performing unit 7152 and a program mode determiner 7154.

The program operation performing unit 7152 may include a dummy data generator 7152a.

When user data is stored (or filled) by a size corresponding to a current program mode in the buffer memory 7130, the program operation performing unit 7152 may program the user data to the memory device 2200. The user data stored by the size corresponding to the current program mode may be referred to as program data.

Even when user data is not stored by the size corresponding to the current program mode in the buffer memory 7130, the program operation performing unit 7152 may program the user data currently stored in the buffer memory 7130 to the memory device 2200 when a flush event occurs. The program operation performing unit 7152 may control the dummy data generator 7152a such that merge data can be generated by adding dummy data to the user data stored in the buffer memory 7130, and program the generated merge data to the memory device 2200. The merge data may have the size corresponding to the current program mode. Therefore, the merge data may be referred to as program data.

The dummy data generator 7152a may transmit the generated dummy data to the buffer memory 7130. Accordingly, the buffer memory 7130 may store merge data obtained by adding the dummy data to the user data.

Whenever a program operation using the first program mode or the second program mode is performed, the program operation performing unit 7152 may notify the program mode determiner 7154 that the program operation using the first program mode or the second program mode is performed. Whenever a program operation using the first program mode is performed, the program operation performing unit 7152 may further provide the program mode determiner 7154 with size information of dummy data generated for the purpose of the corresponding program operation. When the dummy data is not generated, the program operation performing unit 7152 may provide the program mode determiner 7154 with information representing that the dummy data has not been generated.

The program mode determiner 7154 may include a dummy data ratio calculator 7154a, a counter 7154b, and a timer 7154c.

The program mode determiner 7154 may determine a program mode to be used in the program operation, and instruct the program operation performing unit 7152 to perform the program operation by using the determined program mode.

In an embodiment, when the number of program operations performed by using the first program mode, in which a ratio of dummy data to program data is equal to or greater than a predetermined value, is greater than or equal to a predetermined number, the program mode determiner 7154 may change the program mode of the memory device 2200 to the second program mode. Also, the program mode determiner 7154 may instruct the program operation performing unit 7152 to perform a subsequent program operation by using the second program mode.

For example, whenever the program operation performing unit 7152 notifies that a program operation has been performed once, the dummy data ratio calculator 7154a may calculate a ratio of dummy data to program data programmed in the corresponding program operation.

For example, the dummy data ratio calculator 7154a may calculate a ratio of dummy data to program data, based on size information of the dummy data, which is received from the program operation performing unit 7152, and a program unit corresponding to the first program mode. When the calculated ratio of the dummy data is greater than or equal to the predetermined value, the dummy data ratio calculator 7154a may increase a count value by 1. When the count value of the counter 7154b reaches a first count value, the program mode determiner 7154 may change the program mode of the memory device 2200 to the second program mode.

In an embodiment, the program mode determiner 7154 may count the number of program operations in which the ratio of the dummy data to the program data is greater than or equal to the predetermined value for each set time period. For example, whenever a timer value of the timer 7154c reaches a first timer value, the program mode determiner 7154 may initialize the timer value of the timer 7154c and the count value of the counter 7154b. Therefore, the counting of the number of program operations in which the ratio of the dummy data to the program data is greater than or equal to the predetermined value may be performed for each time period.

In an embodiment, when a set time elapses or when a predetermined number of program operations are performed after the program mode of the memory device 2200 is changed to the second program mode, the program mode determiner 7154 may change the program mode of the memory device 2200 to the first program mode. Also, the program mode determiner 7154 may instruct the program operation performing unit 7152 to perform a subsequent program operation by the first program mode.

When the program mode is changed to the second program mode, the program mode determiner 7154 may initialize the timer value of the timer 7154c and the count value of the counter 7154b. When the timer value of the timer 7154c reaches a second timer value, the program mode determiner 7154 may change the program mode of the memory device 2200 to the first program mode. Whenever the program operation performing unit 7152 notifies that a program operation has been performed once, the program mode determiner 7154 may increase the count value of the counter 7154b by 1. When the count value of the counter 7154b reaches the second count value, the program mode determiner 7154 may change the program mode of the memory device 2200 to the first program mode. When the program mode is changed to the first program mode, the program mode determiner 7154 may initialize the count value of the counter 7154b and the timer value of the timer 7154c.

Figure 8:
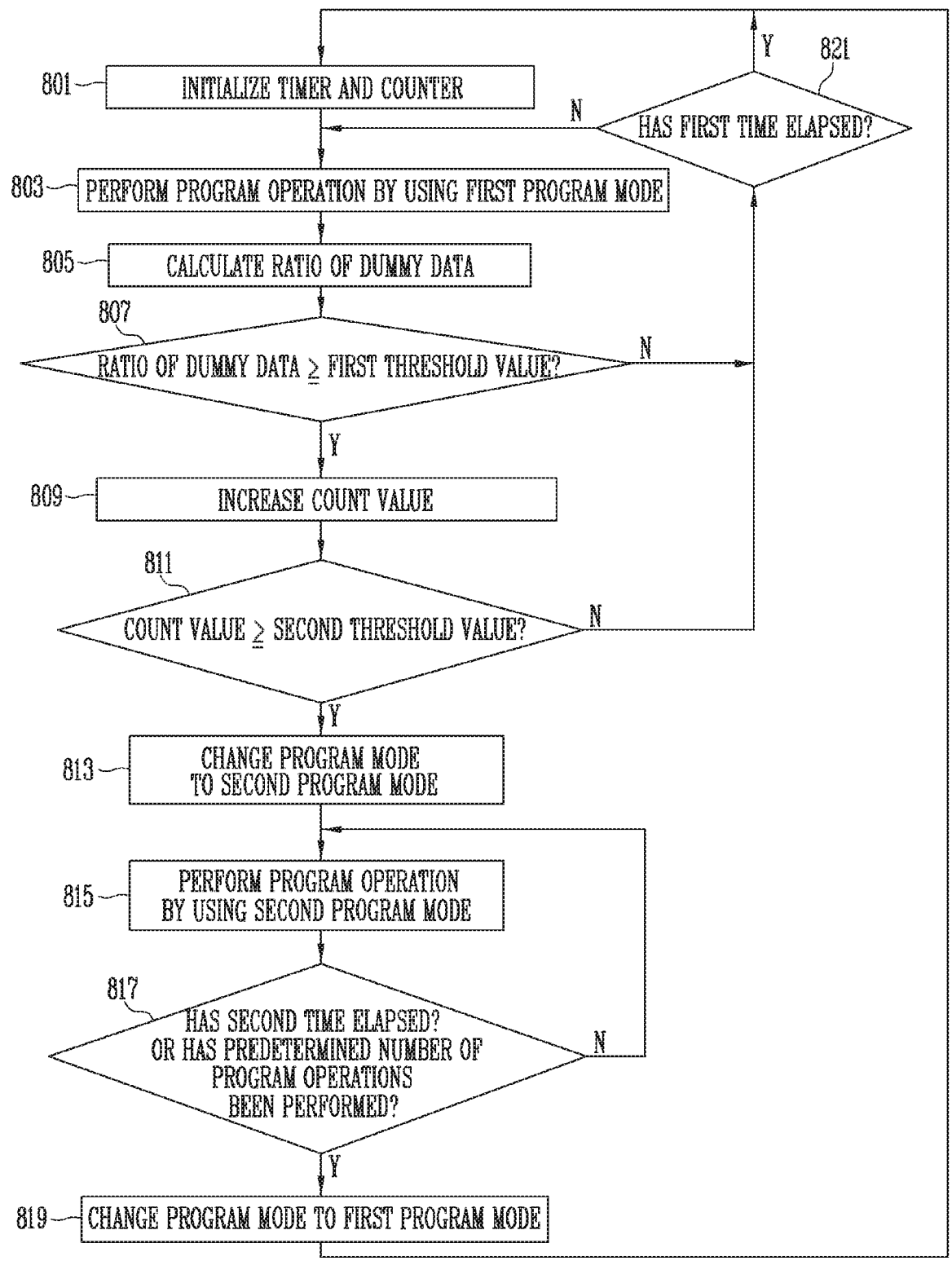

FIG. 8 is a diagram illustrating a process of changing a program mode in accordance with an embodiment of the present disclosure. The process of FIG. 8 may be performed by the memory controller 2100 of FIG. 7.

At least one of steps shown in FIG. 8 may be performed together while the steps shown in FIG. 3. In some embodiments, at least one of steps shown in FIG. 8 may be omitted, and the order of the steps may be changed.

At step 801, the memory controller may initialize a timer value of a timer (e.g., the timer 7154c of FIG. 7) and a counter value of a counter (e.g., the counter 7154b).

At step 803, the memory controller may perform a program operation by using a first program mode. For example, the memory controller may program user data stored in a buffer memory (e.g., the buffer memory 7130) to a memory device (e.g., the memory device 2200). In an embodiment, when the user data stored in the buffer memory does not have a size corresponding to a program unit corresponding to the first program mode, the memory controller may generate merge data having the size corresponding to the program unit corresponding to the first program mode by adding dummy data to the user data. Also, the memory controller may program the generated merge data as a program data to the memory device. In an embodiment, when the user data stored in the buffer memory has the size corresponding to the program unit corresponding to the first program mode, the memory controller may program the user data as a program data to the memory device.

At step 805, the memory controller may calculate a ratio of dummy data to the program data programmed in the step 803. That is, the memory controller may calculate a ratio of dummy data to the program data whenever a program operation is performed by using the first program mode.

At step 807, the memory controller may determine whether the calculated ratio of the dummy data is greater than or equal to a first threshold value. When the calculated ratio of the dummy data is greater than equal to the first threshold value (807, Y), step 809 may be performed. Otherwise (807, N), step 821 may be performed.

At the step 809, the memory controller may increase a count value of the counter by 1. That is, the memory controller may calculate the number of program operations in which the ratio of dummy data to program data performed by using the first program mode is greater than or equal to the first threshold value.

At step 811, the memory controller may determine whether the count value is greater than or equal to a second threshold value. When the count value is greater than or equal to the second threshold value (811, Y), step 813 may be performed. Otherwise (811, N), the step 821 may be performed.

At the step 813, the memory controller may change the program mode of the memory device to a second program mode. That is, when the number of program operations, in which the ratio of the dummy data to the program data performed by using the first program mode is greater than or equal to the first threshold value, is greater than equal to the second threshold value, the memory controller may change the program mode of the memory device to the second program mode from the first program mode.

At step 815, the memory controller may perform a program operation by using the second program mode.

At step 817, the memory controller may determine whether a second time has elapsed from the time at which the program mode of the memory device is changed to the second program mode or whether a predetermined number of program operations have been performed by using the second program mode. When the second time elapses or when the predetermined number of program operations are performed (817, Y), step 819 may be performed. Otherwise (817, N), the step 815 may be performed.

At step 819, the memory controller may change the program mode of the memory device to the first program mode from the second program mode. Subsequently, the step 801 may be performed.

Meanwhile, at the step 821, the memory controller may determine whether a first time has elapsed. When the first time elapses (821, Y), the step 801 may be performed. Otherwise (821, N), the step 803 may be performed. That is, the memory controller may calculate the number of program operations in which the ratio of the dummy data to the program data performed by using the first program mode is greater than or equal to the first threshold value for each set time period.

Figure 9:
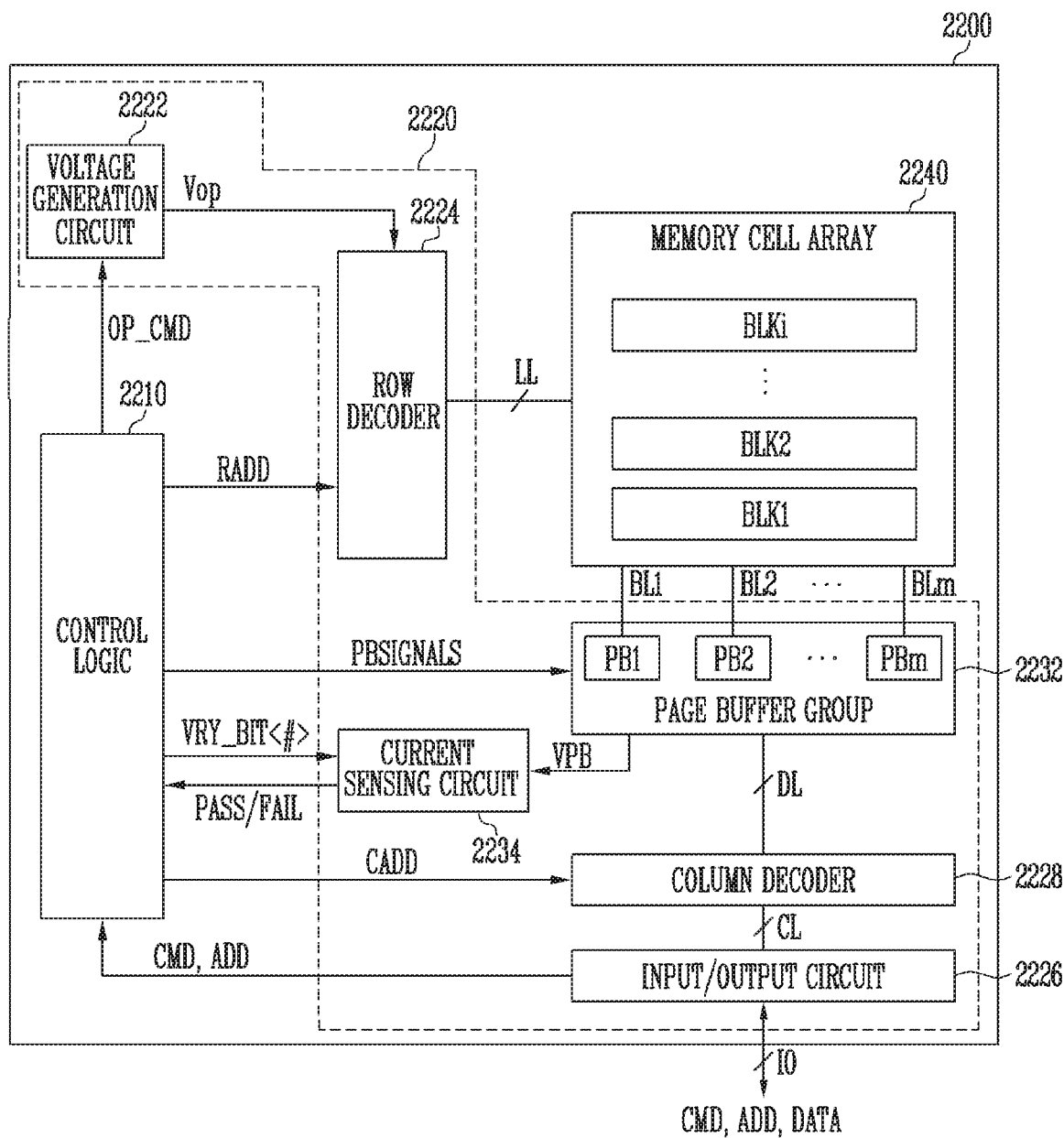

FIG. 9 is a diagram illustrating a memory device 2200 in accordance with an embodiment of the present disclosure. The memory device 2200 shown in FIG. 9 may be applied to the memory system shown in FIGS. 1, 2 and 7.

Referring to FIG. 9, the memory device 2200 may include a control logic 2210, a peripheral circuit 2220, and a memory cell array 2240. The peripheral circuit 2220 may include a voltage generation circuit 2222, a row decoder 2224, an input/output circuit 2226, a column decoder 2228, a page buffer group 2232, and a current sensing circuit 2234.

The control logic 2210 may control the peripheral circuit 2220 under the control of the memory controller 2100 shown in FIGS. 1, 2 and 7.

The control logic 2210 may control the peripheral circuit 2220 in response to a command CMD and an address ADD, which are received from the memory controller 2100 through the input/output circuit 2226. For example, the control logic 2210 may output an operation signal OP_CMD, a row address RADD, page buffer control signals PBSIGNALS, an enable bit VRY_BIT<#>, and a column address CADD in response to the command CMD and the address ADD. The control logic 2210 may determine whether a verify operation has passed or failed in response to a pass or fail signal PASS or FAIL received from the current sensing circuit 2234.

The peripheral circuit 2220 may perform a program operation for storing data in the memory cell array 2240, a read operation for outputting data stored in the memory cell array 2240, and an erase operation for erasing data stored in the memory cell array 2240.

The voltage generation circuit 2222 may generate various operating voltages Vop used in program, read, and erase operations in response to the operation signal OP_CMD received from the control logic 2210. For example, the voltage generation circuit 2222 may transfer a program voltage, a verify voltage, a pass voltage, a read voltage, an erase voltage, a turn-on voltage, and the like to the row decoder 2224.

The row decoder 2224 may transfer the operating voltages Vop to local lines LL connected to a selected memory block among memory blocks of the memory cell array 2240 in response to the row address RAD© received from the control logic 2210. The local lines LL may include local word lines, local drain select lines, and local source select lines. In addition, the local lines LL may include various lines such as a source line, which are connected to the memory block.

The input/output circuit 2226 may transfer the command CMD and the address ADD, which are received from the memory controller 2100, to the control logic 2210 through input/output lines IO, or exchange data DATA with the column decoder 2228.

The column decoder 2228 may transfer data between the input/output circuit 2226 and the page buffer group 2232 in response to a column address CADD received from the control logic 2210. For example, the column decoder 2228 may exchange data with page buffers PB1 to PBm through data lines DL, or exchange data with the input/output circuit 2226 through column lines CL.

The page buffer group 2232 may be connected to bit lines BL1 to BLm commonly connected to memory blocks BLK1 to BLKi. The page buffer group 2232 may include a plurality of page buffers PB1 to PBm connected to the bit lines BL1 to BLm. For example, one page buffer may be connected to each of the bit lines. The page buffers PB1 to PBm may operate in response to the page buffer control signals PBSIGNALS received from the control logic 2210. For example, in a program operation, the page buffers PB1 to PBm may temporarily store program data received from the memory controller 2100, and adjust a voltage applied to the bit lines BL1 to BLm according to the program data. In a read operation, the page buffers PB1 to PBm may temporarily store data received through the bit lines BL1 to BLm, or sense a voltage or current of the bit lines BL1 to BLm.

In a read or verify operation, the current sensing circuit 2234 may generate a reference current in response to the enable bit VRY_BIT<#> received from the control logic 2210. Then, the current sensing circuit 2234 may output a pass or fail signal PASS or FAIL by comparing a sensing voltage VPB received from the page buffer group 2232 with a reference voltage generated by the reference current.

The memory cell array 2240 may include a plurality of memory blocks BLK1 to BLKi in which data is stored. User data and various information required to perform an operation of the memory device 2200 may be stored in the memory blocks BLK1 to BLKi. The memory blocks BLK1 to BLKi may be implemented in a two-dimensional structure or a three-dimensional structure, and be configured identical to one another.

Figure 10:
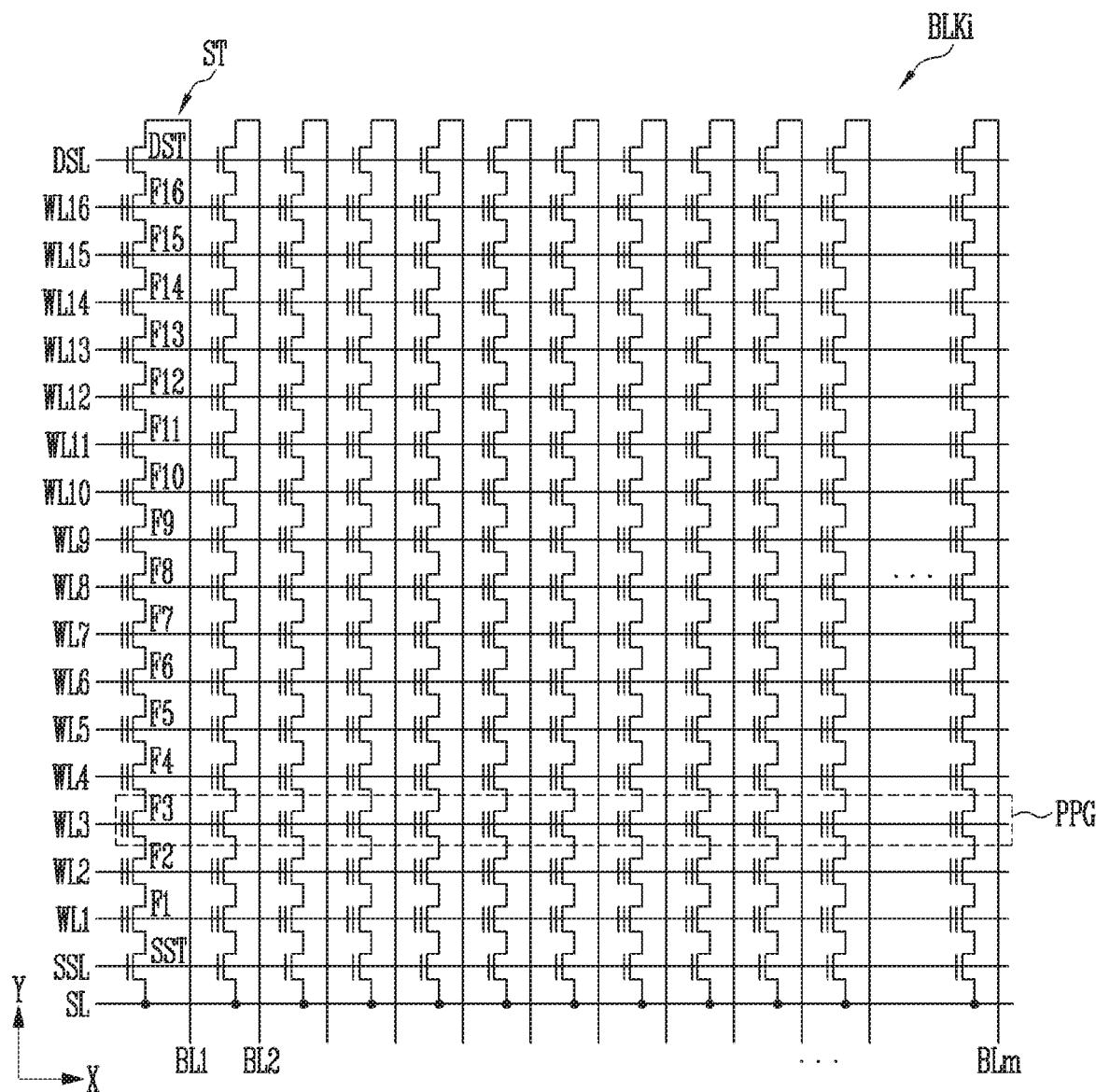

FIG. 10 is a diagram illustrating an example of a memory block.

A memory cell array may include a plurality of memory blocks. For convenience, any one memory block BLKi among the plurality of memory blocks is illustrated in FIG. 10.

In the memory block BLKi, a plurality of word lines arranged in parallel to one another may be connected between a first select line and a second select line. The first select line may be a source select line SSL, and the second select line may be a drain select line DSL. Specifically, the memory block BLKi may include a plurality of strings ST connected between bit lines BL1 to BLm and a source line SL. The bit lines BL1 to BLm may be connected to the strings ST, respectively, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series to each other between the source line SL and the first bit line BL1. At least one source select transistor SST and at least one drain select transistor DST may be included in one string ST, and memory cells having a number larger than that of the memory cells F1 to F16 shown in the drawing may be included in one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, gates of drain select transistors DST included in different strings ST may be connected to the drain select line DSL, gates of the memory cells F1 to F16 included in different strings ST may be connected to a plurality of word lines WL1 to WL16. A group of memory cells connected to the same word line among the memory cells included in different strings ST may be a physical page PPG. Therefore, physical pages PPG having a number which corresponds to that of the word lines WL1 to WL16 may be included in the memory block BLKi.

Figure 11:
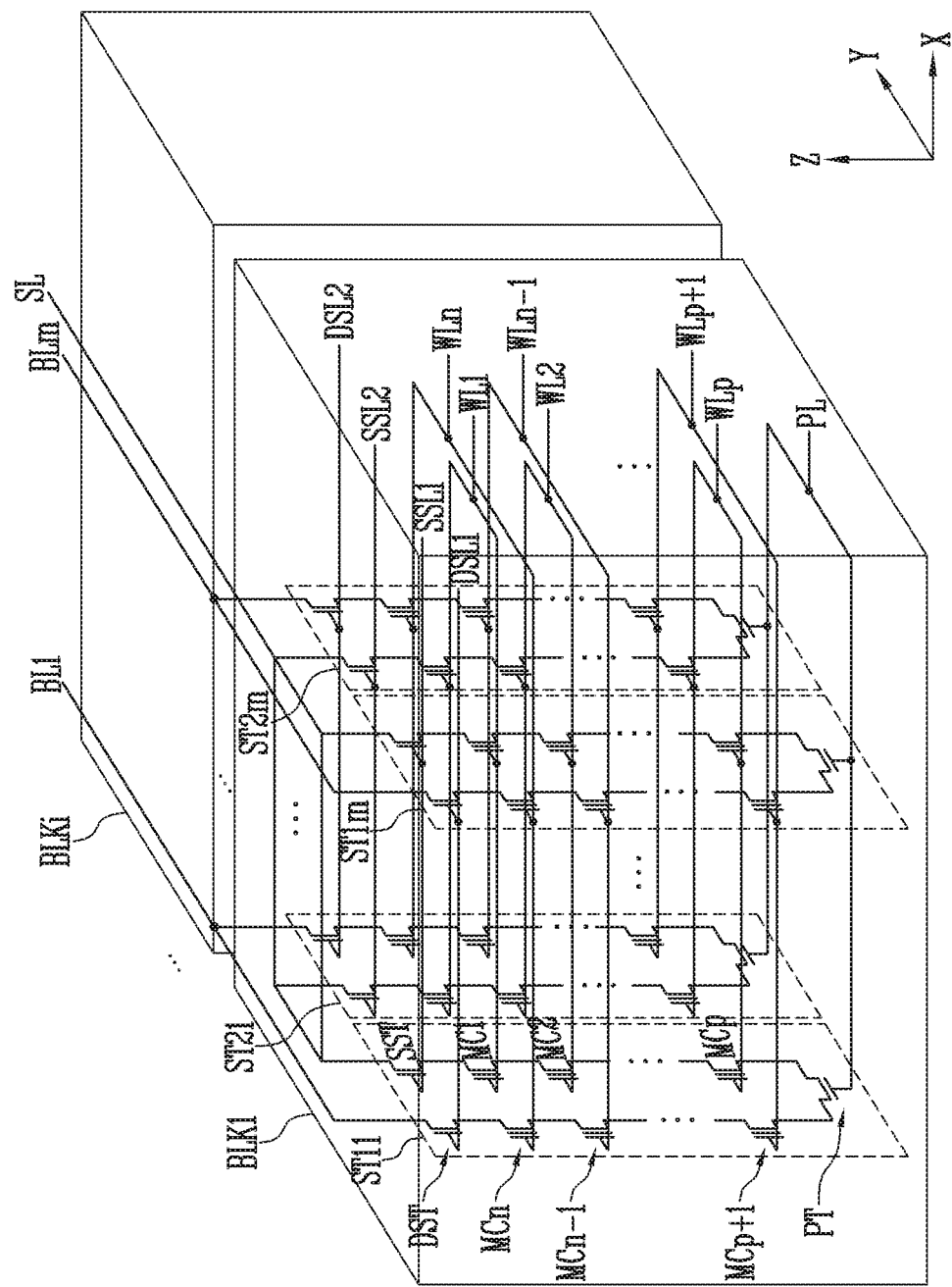

FIG. 11 is a diagram illustrating an example of a memory block having a three-dimensional structure.

The memory cell array 2240 of FIG. 9 may include a plurality of memory blocks BLK1 to BLKi. A first memory block BLK1 will be described as an example. The first memory block BLK1 may include a plurality of strings ST11 to ST1m and ST21 to ST2m. In an embodiment, each of the plurality of strings ST11 to ST1m and ST21 to ST2m may be formed in a 'U' shape. In the first memory block BLK1, m strings may be arranged in a row direction (i.e., X direction). Although FIG. 11 illustrates that two strings are arranged in a column direction (i.e., Y direction), this is for convenience, and three or more strings may be arranged in the column direction (i.e., Y direction).

Each of the plurality of strings ST11 to ST1m and ST21 to ST2m may include at least one source select transistor SST, first to nth memory cells MC1 to MCn, a pipe transistor PT, and at least one drain select transistor DST.

The source and drain select transistors SST and DST and the memory cells MC1 to MCn may have structures similar to one another. For example, each of the source and drain select transistors SST and DST and the memory cells MC1 to MCn may include a channel layer, a tunnel insulating layer, a charge trapping layer, and a blocking insulating layer. For example, a pillar for providing the channel layer may be provided in each string. For example, a pillar for providing at least one of the channel layer, the tunnel insulating layer, the charge trapping layer, and the blocking insulating layer may be provided in each string.

The source select transistor SST of each string may be connected between a source line SL and memory cells MC1 to MCp.

In an embodiment, source select transistors of strings arranged in the same row may be connected to a source select line extending in the row direction, and source select transistors of strings arranged in different rows may be connected to different source select lines. In FIG. 11, source select transistors of strings ST11 to ST1m of a first row may be connected to a first source select line SSL1. Source select transistors of strings ST21 to ST2m of a second row may be connected to a second source select line SSL2.

In another embodiment, the source select transistors of the strings ST11 to ST1m and ST21 to ST2m may be commonly connected to one source select line.

First to nth memory cells MC1 to MCn of each string may be connected between the source select transistor SST and the drain select transistor DST.

The first to nth memory cells MC1 to MCn may be divided into first to pth memory cells MC1 to MCp and (p+1)th to nth memory cells MCp+1 to MCn. The first to pth memory cells MC1 to MCp may be sequentially arranged in a vertical direction (i.e., Z direction), and be connected in series to each other between the source select transistor SST and the pipe transistor PT. The (p+1)th to nth memory cells MCp+1 to MCn may be sequentially arranged in the vertical direction (i.e., Z direction), and be connected in series to each other between the pipe transistor PT and the drain select transistor DST. The first to pth memory cells MC1 to MCp and the (p+1)th to nth memory cells MCp+1 to MCn may be connected to each other through the pipe transistor PT. Gates of the first to nth memory cells MC1 to MCn of each string may be connected to first to nth word lines WL1 to WLn, respectively.

In an embodiment, at least one of the first to nth memory cells MC1 to MCn may be used as a dummy memory cell. When a dummy memory cell is provided, the voltage or current of a corresponding string can be stably controlled. A gate of the pipe transistor PT of each string may be connected to a pipe line PL.

The drain select transistor DST of each string may be connected to a bit line and the memory cells MCp+1 to MCn. Strings arranged in the row direction may be connected to a drain select line extending in the row direction. Drain select transistors of the strings ST11 to ST1m of the first row may be connected to a first drain select line DSL1. Drain select transistors of the strings ST21 to ST2m of the second row may be connected to a second drain select line DSL2.

Strings arranged in the column direction may be connected to bit lines extending in the column direction. In FIG. 11, strings ST11 and ST21 of a first column may be connected to a first bit line BL1. Strings ST1m and ST2m of an mth column may be connected to an mth bit line BLm.

Memory cells connected to the same word line among the strings arranged in the row direction may constitute one page. For example, memory cells connected to the first word line WL1 among the strings ST11 to ST1m of the first row may constitute one page. Memory cells connected to the first word line WL1 among the strings ST21 to ST2m of the second row may constitute another page. When any one of the drain select lines DSL1 and DSL2 is selected, strings arranged in one row direction may be selected. When any one of the word lines WL1 to WLn is selected, one page among the selected strings may be selected.

FIG. 12 is a diagram illustrating another example of a memory block having a three-dimensional structure.

The memory cell array 2240 of FIG. 9 may include a plurality of memory blocks BLK1 to BLKi. A first memory block BLKI will be described as an example. Referring to FIG. 12, the first memory block BLK1 may include a plurality of strings ST11' to ST1m' and ST21' to ST2m'. Each of the plurality of strings ST11' to ST1m' and ST21' to ST2m' may extend along a vertical direction (i.e., Z direction). In the first memory block BLK1, m' strings may be arranged in a row direction (i.e., X direction). Although FIG. 12 illustrates that two strings are arranged in a column direction (i.e., Y direction), this is for convenience, and three or more strings may be arranged in the column direction (i.e., Y direction).

Each of the plurality of strings ST11' to ST1m' and ST21' to ST2m' may include at least one source select transistor SST, first to nth memory cells MC1 to MCn, and at least one drain select transistor DST.

The source select transistor SST of each string may be connected between a source line SL and the memory cells MC1 to MCn. Source select transistors of strings arranged in the same row may be connected to the same source select line. Source select transistors of strings ST11' to ST1m' arranged on a first row may be connected to a first source select line SSL1. Source select transistors of strings ST21' to ST2m' arranged on a second row may be connected to a second source select line SSL2. In another embodiment, the source select transistors of the strings ST11' to ST1m' and ST21' to ST2m' may be commonly connected to one source select line.

The first to nth memory cells MC1 to MCn of each string may be connected in series to each other between the source select transistor SST and the drain select transistor DST. Gates of the first to nth memory cells MC1 to MCn may be connected to first to nth word lines WL1 to WLn, respectively.

In an embodiment, at least one of the first to nth memory cells MC1 to MCn may be used as a dummy memory cell. When a dummy memory cell is provided, the voltage or current of a corresponding string can be stably controlled. Accordingly, the reliability of data stored in the first memory block BLK1 can be improved.

The drain select transistor DST of each string may be connected between a bit line and the memory cells MC1 to MCn. Drain select transistors DST of strings arranged in the row direction may be connected to a drain select line extending in the row direction. The drain select transistors DST of the strings ST11' to ST1m' of the first row may be connected to a first drain select line DSL1. The drain select transistors DST of the strings ST21' to ST2m' of the second row may be connected to a second drain select line DSL2.

That is, the first memory block BLK1 of FIG. 12 may have a circuit identical to that of the first memory block BLK1 of FIG. 11, except that the pipe transistor PT is excluded from each string.

Figure 13:
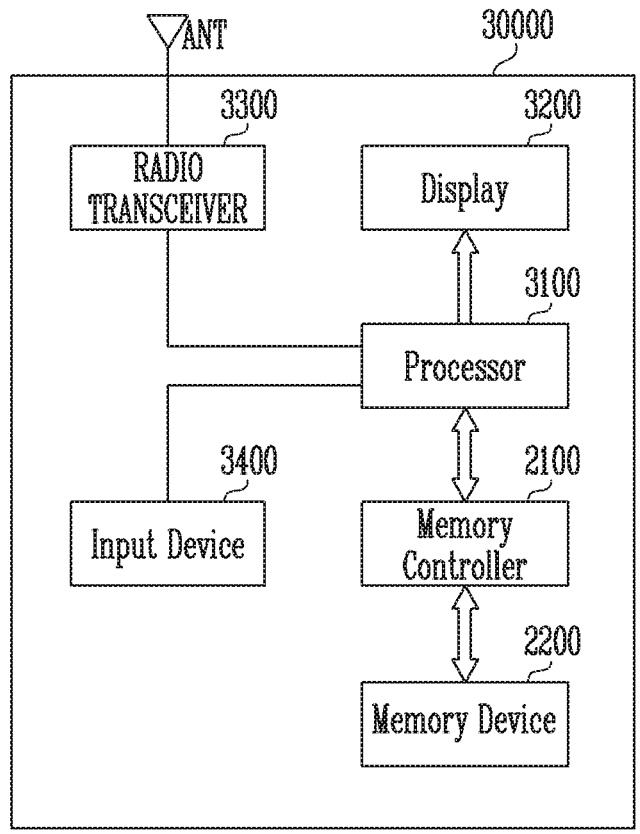

FIG. 13 is a diagram illustrating another example of a memory system 30000 including the memory controller shown in FIGS. 1, 2 and 7.

Referring to FIG. 13, the memory system 30000 may be implemented as a cellular phone, a smart phone, a tablet PC, a personal digital assistant (PDA), or a wireless communication device. The memory system 30000 may include a memory controller 2100 and a memory device 2200. The memory controller 2100 may control an operation of the memory device 2200.

The memory controller 2100 may control a data access operation of the memory device 2200, e.g., a program operation, an erase operation, a read operation, or the like under the control of a processor 3100.

Data programmed in the memory device 2200 may be output through a display 3200 under the control of the memory controller 2100.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 2100 or the display 3200. The memory controller 2100 may transmit the signal processed by the processor 3100 to the memory device 2200. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 2100, data output from the radio transceiver 3300, or data output from the input device 3400 can be output through the display 3200.

In some embodiments, the memory controller 2100 capable of controlling an operation of the memory device 2200 may be implemented as a part of the processor 3100, or be implemented as a chip separate from the processor 3100.

Figure 14:
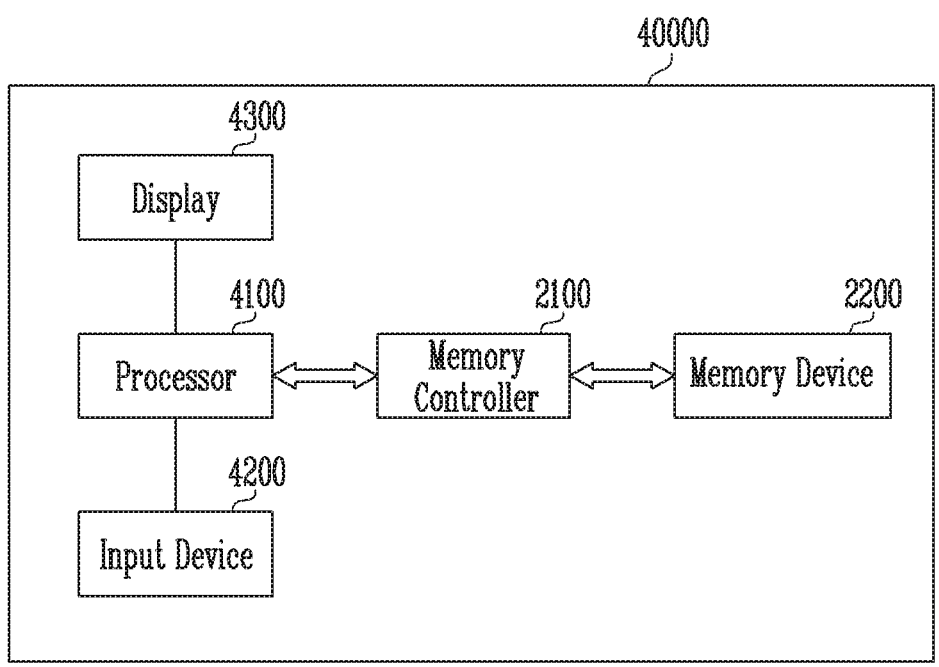

FIG. 14 is a diagram illustrating another example of a memory system 40000 including the memory controller shown in FIGS. 1, 2 and 7.

Referring to FIG. 14, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory controller 2100 and a memory device 2200. The memory controller 2100 may control a data processing operation of the memory device 2200.

A processor 4100 may output data stored in the memory device 2200 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 2100. In some embodiments, the memory controller 2100 capable of controlling an operation of the memory device 2200 may be implemented as a part of the processor 4100, or be implemented as a chip separate from the processor 4100.

Figure 15:
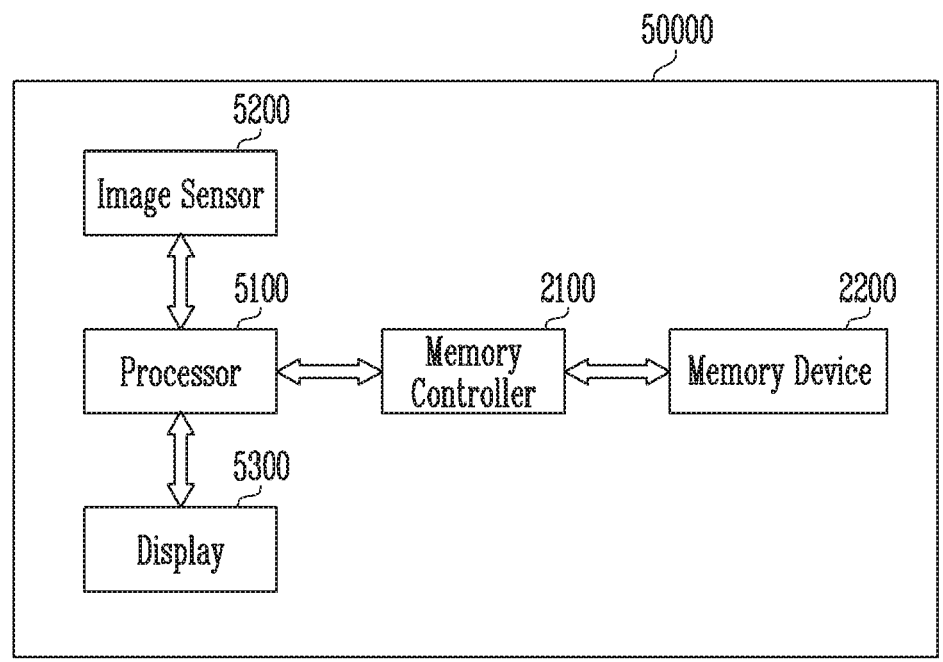

FIG. 15 is a diagram illustrating another example of a memory system 50000 including the memory controller shown in FIGS. 1, 2 and 7.

Referring to FIG. 15, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory controller 2100 and a memory device 2200. The memory controller 2100 may control a data processing operation of the memory device 2200, e.g., a program operation, an erase operation, or a read operation.

An image sensor 5200 of the memory system 50000 may convert an optical image into digital signals, and the converted digital signals may be transmitted to a processor 5100 or the memory controller 2100. Under the control of the processor 5100, the converted digital signals may be output through a display 5300, or be stored in the memory device 2200 through the memory controller 2100. In addition, data stored in the memory device 2200 may be output through the display 5300 under the control of the processor 5100 or the memory controller 2100.

In some embodiments, the memory controller 2100 capable of controlling an operation of the memory device 2200 may be implemented as a part of the processor 5100, or be implemented as a chip separate from the processor 5100.

Figure 16:
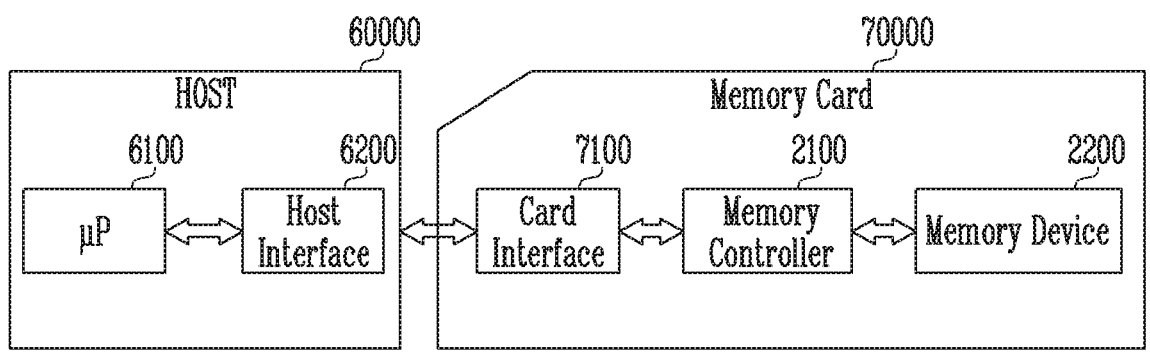

FIG. 16 is a diagram illustrating another example of a memory system 70000 including the memory controller shown in FIGS. 1, 2 and 7.

Referring to FIG. 16, the memory system 70000 may be implemented as a memory card or a smart card. The memory system 70000 may include a memory controller 2100, a memory device 2200, and a card interface 7100.

The memory controller 2100 may control data exchange between the memory device 2200 and the card interface 7100. In some embodiments, the card interface 7100 may be a Secure Digital (SD) card interface or a Multi-Media Card (MMC) interface, but the present disclosure is not limited thereto.

The card interface 7100 may interface data exchange between a host 60000 and the memory controller 2100 according to a protocol of the host 60000. In some embodiments, the card interface 7100 may support a Universal Serial Bus (USB) protocol and an Inter-Chip (IC)-USB protocol. The card interface 7100 may mean hardware capable of supporting a protocol used by the host 60000, software embedded in the hardware, or a signal transmission scheme.

When the memory system 70000 is connected to a host interface 6200 of the host 60000 such as a PC, a tablet PC, a digital camera, a digital audio player, a cellular phone, console video game hardware, or a digital set-top box, the host interface 6200 may perform data communication with the memory device 2200 through the card interface 7100 and the memory controller 2100 under the control of a microprocessor (µP) 6100.

In accordance with the present disclosure, dummy data can be prevented from being excessively programmed.

In accordance with the present disclosure, write amplification can be reduced and the lifetime of the memory device can be enhanced.

Example embodiments have been disclosed herein, and although specific terms are employed, the terms are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
a memory device configured to store data; and
a memory controller configured to perform a program operation on the memory device by using one of a first program mode and a second program mode,
wherein the memory controller configured to:
count a number of program operations performed by using the first program mode in which a ratio of dummy data to program data is greater than or equal to a predetermined value; and
change the program mode to the second program mode from the first program mode, when the counted number is greater than or equal to a predetermined number.

2. The memory system of claim 1, wherein the memory controller counts the number of program operations in which the ratio of the dummy data to the program data is greater than or equal to the predetermined value for each set time period.

3. The memory system of claim 1, wherein the memory controller calculates the ratio of the dummy data to the program data whenever the program operation is performed by using the first program mode.

4. The memory system of claim 1, wherein, when a set time elapses or when a predetermined number of program operations are performed after the program mode is changed to the second program mode, the memory controller changes the program mode to the first program mode from the second program mode.

5. The memory system of claim 1, wherein the first program ode includes an n-bit multi level cell (MLC) mode, and
the second program mode includes an m-bit MLC mode or a single level cell (SLC) mode, and
wherein m and n are natural numbers, and $2 \leq m < n$.

6. A memory system comprising:
a memory device including a first memory block for storing n bits of data per cell and a second memory block for storing m bit(s) of data per cell, wherein m and n are natural numbers, and $1 \leq m < n$; and
a memory controller configured to program program data in the first memory block in a program operation, calculate a ratio of dummy data to the program data, and program subsequent program data in the second memory block when the ratio of the dummy data to the program data exceeds a threshold value.

7. The memory system of claim 6, wherein, whenever a set time period elapses, the memory controller calculates the ratio of the dummy data to the program data programmed during the set time period.

8. The memory system of claim 6, wherein, whenever the program data are programmed by a set size in the first memory block, the memory controller calculates the ratio of the dummy data to the program data having the set size.

9. The memory system of claim 6, wherein, when a set time elapses or when the subsequent program data are programmed by a set size while the subsequent program data are being programmed in the second memory block, the memory controller programs subsequent program data in the first memory block.

10. A method of operating a memory system, the method comprising:
performing a plurality of program operations by using a first program mode;
counting a number of program operations in which a ratio of dummy data to program data is greater than or equal to a predetermined value, among program operations performed by using the first program mode; and
performing subsequent program operations by using a second program mode when the counted number is greater than or equal to a predetermined number.

11. The method of claim 10, wherein the counting of the number of program operations includes counting the number of program operations in which the ratio of the dummy data to the program data is greater than or equal to a predetermined value for each set time period.

12. The method of claim 10, further comprises calculating the ratio of the dummy data whenever the program operation is performed by using the first program mode.

13. The method of claim 10, further comprises, when a set time elapses from the start of the subsequent program operations performed by using the second program mode or when a number of the subsequent program operations performed by using the second program mode is greater than or equal to a predetermined number, performing a subsequent program operation by using the first program mode.

14. The method of claim 10, wherein the first program mode includes an n-bit multi level cell (MLC) mode, and
the second program mode includes an m-bit MLC mode or a single level cell (SLC) mode, and
wherein m and n are natural numbers, and $2 \leq m < n$.

* * * * *